(12) United States Patent
Gokhale et al.

(10) Patent No.: US 11,010,830 B2
(45) Date of Patent: May 18, 2021

(54) LOAN SELECTION INTERFACE FOR A VEHICLE TRANSFER TRANSACTION

(71) Applicant: AutoFi, Inc., San Francisco, CA (US)

(72) Inventors: Mandar Gokhale, San Carlos, CA (US); James Hinds, Denver, CO (US); Christopher Trailer, Menlo Park, CA (US); Jared Lera, Palo Alto, CA (US)

(73) Assignee: AUTOFI, INC., San Francisco, CA (US)

(*) Notice: Subject to any disclaimer, the term of this patent is extended or adjusted under 35 U.S.C. 154(b) by 200 days.

(21) Appl. No.: 15/678,044

(22) Filed: Aug. 15, 2017

(65) Prior Publication Data

US 2018/0053253 A1 Feb. 22, 2018

Related U.S. Application Data

(60) Provisional application No. 62/375,572, filed on Aug. 16, 2016.

(51) Int. Cl.
*G06Q 30/00* (2012.01)
*G06Q 40/02* (2012.01)
(Continued)

(52) U.S. Cl.
CPC ......... *G06Q 40/025* (2013.01); *G06F 16/951* (2019.01); *G06Q 30/0222* (2013.01);
(Continued)

(58) Field of Classification Search
CPC .... G06Q 10/00; G06Q 30/00; G06Q 30/0222; G06Q 30/0234; G06Q 30/0239;
(Continued)

(56) References Cited

U.S. PATENT DOCUMENTS 8,392,280 B1 3/2013 Kilshaw
9,727,904 B2 8/2017 Inghelbrecht et al.
(Continued)

FOREIGN PATENT DOCUMENTS

WO WO 01/67210 A2 9/2001

OTHER PUBLICATIONS

"Event Brief of Q1 2009 Avis Budget Group, Inc. Earnings Conference Call—Final," Fair Disclosure Wire, 2009. Available: https://dialog.proquest.com/professional/docview/466072690?accountid=131444. (Year: 2009).*

(Continued)

*Primary Examiner* — Rajesh Khattar
*Assistant Examiner* — Mohammed H Mustafa
(74) *Attorney, Agent, or Firm* — Fenwick & West LLP

(57) ABSTRACT

A vehicle transfer system provides a transaction interface that is displayed as part of a web page for a vehicle on a vehicle dealer's website. The transaction interface allows a customer to perform a vehicle transfer transaction on the dealer's website. The system can facilitate multiple financing methods for the transaction. If the transaction is financed with a loan, the system can request loan offers for a plurality of different loan terms and down payment amounts, and then provide a loan selection interface, which allows the customer to select a loan term and down payment amount and then displays the loan offers matching the customer's selections. If the transaction is financed with a lease, the system can perform a leasing calculation that solves for a balancing point between the total upfront capital that is available to the customer and the total expenses due at lease signing.

20 Claims, 22 Drawing Sheets

(51) Int. Cl.
*G06Q 30/02* (2012.01)
*G06F 16/951* (2019.01)
*G06Q 30/06* (2012.01)
*G06F 3/0484* (2013.01)
*G06F 3/0482* (2013.01)

(52) U.S. Cl.
CPC ..... *G06Q 30/0234* (2013.01); *G06Q 30/0239* (2013.01); *G06Q 30/0283* (2013.01); *G06Q 30/0643* (2013.01); *G06Q 30/0645* (2013.01); *G06F 3/0482* (2013.01); *G06F 3/04847* (2013.01)

(58) Field of Classification Search
CPC ........... G06Q 30/0283; G06Q 30/0643; G06Q 30/0645; G06Q 40/00; G06Q 40/025; G06Q 30/0635; G06F 16/951; G06F 3/0482; G06F 3/04847
USPC .................................................. 705/4, 35–45
See application file for complete search history.

(56) References Cited

U.S. PATENT DOCUMENTS

| | | | | |
|---|---|---|---|---|
| 10,140,553 | B1* | 11/2018 | Vasisht | G06N 3/0454 |
| 2004/0128262 | A1* | 7/2004 | Nafousi | G06Q 30/0283 |
| | | | | 705/400 |
| 2008/0001595 | A1* | 1/2008 | Huber | G06Q 30/0261 |
| 2008/0015954 | A1* | 1/2008 | Huber | G06Q 40/02 |
| | | | | 705/38 |
| 2008/0027856 | A1* | 1/2008 | Owens | G06Q 40/02 |
| | | | | 705/38 |
| 2011/0264552 | A1* | 10/2011 | Seergy | G06Q 30/06 |
| | | | | 705/26.3 |
| 2014/0279275 | A1* | 9/2014 | Burgiss | G06Q 30/0635 |
| | | | | 705/26.81 |
| 2017/0046792 | A1* | 2/2017 | Haldenby | G06F 21/645 |
| 2020/0082325 | A1* | 3/2020 | Wylie | H04W 4/029 |

OTHER PUBLICATIONS

United States Office Action, U.S. Appl. No. 15/678,049, dated Jul. 19, 2019, 20 pages.

* cited by examiner

Your total vehicle cost is $29,267.30.

This includes the cost of your vehicle, taxes, fees, optional protection plans, rebates, and discounts. It doesn't include any trade-in value, your down payment, or finance charges.

Vehicle Price
Base Price            $31,600.00
John Smith Ford Discount      -$3,871.00
        Subtotal  $27,729.00

Rebates
Retail Bonus Customer Cash      -$2,000.00
        Subtotal  -$2,000.00

Taxes & Fees
Title & Registration         $24.00
Doc Fee             $199.00
Tire Tax              $1.25
Total Taxes           $1,709.05
        Subtotal  $1,933.30

Add-Ons
PremiumCARE          $1,605.00
        Subtotal  $1,605.00

Total Cost           $29,267.30

Your down payment is $2,600.00, and you have a net trade-in value of $3,513.00, which means you're financing $23,154.30.

Total Cost
Total Cost           $29,267.30
Down Payment         -$2,600.00
Net Trade-in Value        -$3,513.00
     Amount Financed  $23,154.30

Your APR is 0.00% over 48 months, so your monthly payment is $482.38.

Financing Information

FIG. 3E which means you're financing $23,154.30.

Total Cost

| | |
|---|---|
| Total Cost | $29,267.30 |
| Down Payment | -$2,600.00 |
| Net Trade-in Value | -$3,513.00 |
| Amount Financed | $23,154.30 |

Your APR is 0.00% over 48 months, so your monthly payment is $482.38.

Financing Information

| | |
|---|---|
| APR | 0.00% |
| Term | 48 months |
| Amount Financed | $23,154.30 |
| Finance Charge | $0.00 |
| Total of Payments | $23,154.30 |
| Monthly Payment | $482.38 |

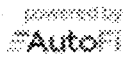

Support   Terms   Privacy Policy

You should know

The date you sign the contract may impact your APR and incentives. The monthly payment calculation above is based on a first payment date 45 days from the date of signing. The first payment date will be finalized when you visit the dealership and may impact the monthly payment amount.

Additionally, we've done our best to estimate the taxes and registration fees here, but the final amounts are determined by the government.

FIG. 3F

Mon Wed Thu 9am-8pm
Tue Fri Sat 9am-6pm
(317) 555-5555

When you pick it up, you'll need:

- Your trade-in
- Proof of insurance
- Proof of residence
- Proof of income
- Government-issued photo ID Your down payment of $2600 will be due when you pick up your vehicle.

Thank you for choosing John Smith Ford!

For technical support check FAQ or call us
at (855) 855-2585

Close

Terms and Privacy Policy

FIG. 3H

We'll save your application for:

Days　Hours　Min　Sec

09 : 23 : 59 : 27

After this time your application will be disabled to protect your information. We'll notify you via email before it expires.

Access your application via link below.
We've also sent this link to your email address.

https://ford.autofi.com/t2/rksv7　　　　Copy Link

Cancel

FIG. 4B

| Lender A | 30 mos. | 36 mos. | 42 mos. | 48 mos. | 54 mos. | 60 mos. | 66 mos. | 72 mos. |
|---|---|---|---|---|---|---|---|---|
| 5% | 5.25% | 5.50% | 5.75% | 6.00% | 6.25% | 6.50% | N/A | N/A |
| 10% | 5.00% | 5.25% | 5.50% | 5.75% | 6.00% | 6.25% | 6.50% | N/A |
| 15% | 4.75% | 5.00% | 5.25% | 5.50% | 5.75% | 6.00% | 6.25% | 6.50% |
| 20% | 4.50% | 4.75% | 5.00% | 5.25% | 5.50% | 5.75% | 6.00% | 6.25% |
| 25% | 4.25% | 4.50% | 4.75% | 5.00% | 5.25% | 5.50% | 5.75% | 6.00% |
| 30% | 4.00% | 4.25% | 4.50% | 4.75% | 5.00% | 5.25% | 5.50% | 5.75% |

FIG. 5B

| Lender B | 30 mos. | 36 mos. | 42 mos. | 48 mos. | 54 mos. | 60 mos. | 66 mos. | 72 mos. |
|---|---|---|---|---|---|---|---|---|
| 5% | 5.30% | 5.55% | 5.80% | 5.95% | 6.20% | 6.45% | 6.70% | 6.95% |
| 10% | 5.05% | 5.30% | 5.45% | 5.70% | 5.95% | 6.20% | 6.45% | N/A |
| 15% | 4.80% | 4.95% | 5.20% | 5.45% | 5.70% | 5.95% | 6.20% | 6.45% |
| 20% | 4.45% | 4.70% | 4.95% | 5.20% | 5.45% | 5.70% | 5.95% | 6.20% |
| 25% | 4.20% | 4.45% | 4.70% | 4.95% | 5.20% | 5.45% | 5.70% | 5.95% |
| 30% | 3.95% | 4.20% | 4.45% | 4.70% | 4.95% | 5.20% | 5.45% | 5.70% |

FIG. 5C

| Lender C | 30 mos. | 36 mos. | 42 mos. | 48 mos. | 54 mos. | 60 mos. | 66 mos. | 72 mos. |
|---|---|---|---|---|---|---|---|---|
| 5% | N/A | 5.55% | 5.80% | 6.00% | 6.25% | 6.50% | 6.65% | 6.90% |
| 10% | N/A | 5.30% | 5.50% | 5.75% | 6.00% | 6.25% | 6.40% | N/A |
| 15% | N/A | 5.00% | 5.25% | 5.50% | 5.75% | 5.90% | 6.15% | 6.40% |
| 20% | N/A | N/A | 5.00% | 5.25% | 5.40% | 5.65% | 5.90% | 6.15% |
| 25% | N/A | N/A | 4.75% | 4.90% | 5.15% | 5.40% | 5.65% | 5.90% |
| 30% | N/A | N/A | N/A | 4.75% | 5.00% | 5.25% | 5.40% | 5.65% |

FIG. 5D

| Lowest Lender | 30 mos. | 36 mos. | 42 mos. | 48 mos. | 54 mos. | 60 mos. | 66 mos. | 72 mos. |
|---|---|---|---|---|---|---|---|---|
| 5% | A (5.25%) | A (5.50%) | A (5.75%) | B (5.95%) | B (6.20%) | B (6.45%) | C (6.65%) | C (6.90%) |
| 10% | A (5.00%) | A (5.25%) | B (5.45%) | B (5.70%) | B (5.95%) | B (6.20%) | C (6.40%) | N/A |
| 15% | A (4.75%) | B (5.00%) | B (5.20%) | B (5.45%) | B (5.70%) | C (5.90%) | C (6.15%) | C (6.40%) |
| 20% | B (4.45%) | B (4.70%) | B (4.95%) | B (5.20%) | C (5.40%) | C (5.65%) | C (5.90%) | C (6.15%) |
| 25% | B (4.20%) | B (4.45%) | B (4.70%) | C (4.90%) | C (5.15%) | C (5.40%) | C (5.65%) | C (5.90%) |
| 30% | B (3.95%) | B (4.20%) | B (4.45%) | B (4.70%) | B (4.95%) | B (5.20%) | C (5.40%) | C (5.65%) |

FIG. 5E

Choose financing offer

Adjust your term and down payment to find your deal.

Term                                          36 months

Cash Down                                     $0

3 offers match your preferences.

| Lender A | Lender B | Lender C |
|---|---|---|
| $671/month | $695/month | $785/month |
| Rebate $2,000 | Rebate $0,000 | APR 6.15% |
| APR 0% | APR 6.15% | Term 36 months |
| Term 36 months | Term 36 months | Cash Down $0 |
| Cash Down $0 | Cash Down $0 | |

Have more questions?

FIG. 5F

Est. Monthly Payment
$242.21

| Down Payment | Term | Rebates | Annual Mileage |
|---|---|---|---|
| $2,000 | 36 mo | $8,757 | 15,000 |

Payment Details

▼ Gross Capitalized Cost

| | | |
|---|---|---|
| Base Price (MSRP) | | $30,095.00 |
| Blant Ford Discount | | -$2,256.00 |
| Doc Fee | | $250.00 |
| Acquisition Fee | | $645.00 |
| Tax | | $683.35 |
| | Subtotal | $29,197.35 |

▼ Capitalized Cost Reduction

| | | |
|---|---|---|
| Cash | | -$1,115.45 |
| Rebates | | -$8,757.00 |
| | Subtotal | -$9,872.45 |

▼ Total of Base Payments

| | | |
|---|---|---|
| Depreciation | | $8,495.10 |
| Rent Charge | | $224.46 |
| | Subtotal | $8,719.56 |

▼ Monthly Payment Plus Tax

| | | |
|---|---|---|
| Lease Term | | 36 months |
| Base Monthly Payment | | $242.21 |
| | Subtotal | $242.21 |

▼ Cash Due at Signing

| | | |
|---|---|---|
| Capitalized Cost Reduction | | $9,872.45 |
| Capitalized Cost Reduction Tax | | $592.34 |
| Title & Registration | | $50.00 |
| First Monthly Payment | | $242.21 |
| Rebates Applied | | -$8,757.00 |
| | Subtotal | $2,000.00 |

| | |
|---|---|
| Estimated Monthly Payment | $242.21 |

( Select this Lease )

FIG. 6D

LOAN SELECTION INTERFACE FOR A VEHICLE TRANSFER TRANSACTION

CROSS-REFERENCE TO RELATED APPLICATION

This application claims the benefit of U.S. Provisional Application No. 62/375,572, filed Aug. 16, 2016, which is hereby incorporated by reference in its entirety.

TECHNICAL FIELD

This disclosure relates generally to vehicle transfer services and more particularly to a computing system that allows a vehicle transfer transaction to be performed on a vehicle dealer's website.

BACKGROUND

Conventional transactions between vehicle dealers and customers have several disadvantages. For instance, the estimates for loan and lease payments provided by many vehicle dealers are often inaccurate because they are based on incomplete information about the prospective customer. Moreover, such estimates fail to take into account a variety of factors that may impact the amount of the payments. This makes the process of performing a transaction more frustrating and inefficient for both the vehicle dealer and the customer.

Furthermore, vehicle transactions are often subject to a short transaction window. In other words, a dealer is more likely to retain a customer if the dealer is able to initiate a transaction, negotiate the terms of a transaction, and close the transaction in a shorter time window. Thus, in addition to the added frustration and inefficiency, the inability to rapidly and accurately provide data to a prospective customer may result in the dealer losing a vehicle sale or lease to a competitor.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

Figure (FIG. 1 illustrates an example system environment for a vehicle transfer system, according to one embodiment.

FIGS. 3B-3H are example screenshots of the transaction interface, according to one embodiment.

FIG. 4B is an example screenshot of another portion of the transaction interface, according to one embodiment.

FIGS. 5B-5E illustrate example data structures for providing a loan selection interface that presents loan offers from a plurality of different lenders, according to one embodiment.

FIGS. 5F-5H are example screenshots of the loan selection interface, according to one embodiment.

FIGS. 6B-6D are example screenshots of the lease calculation interface, according to one embodiment.

DETAILED DESCRIPTION

Figure 1:
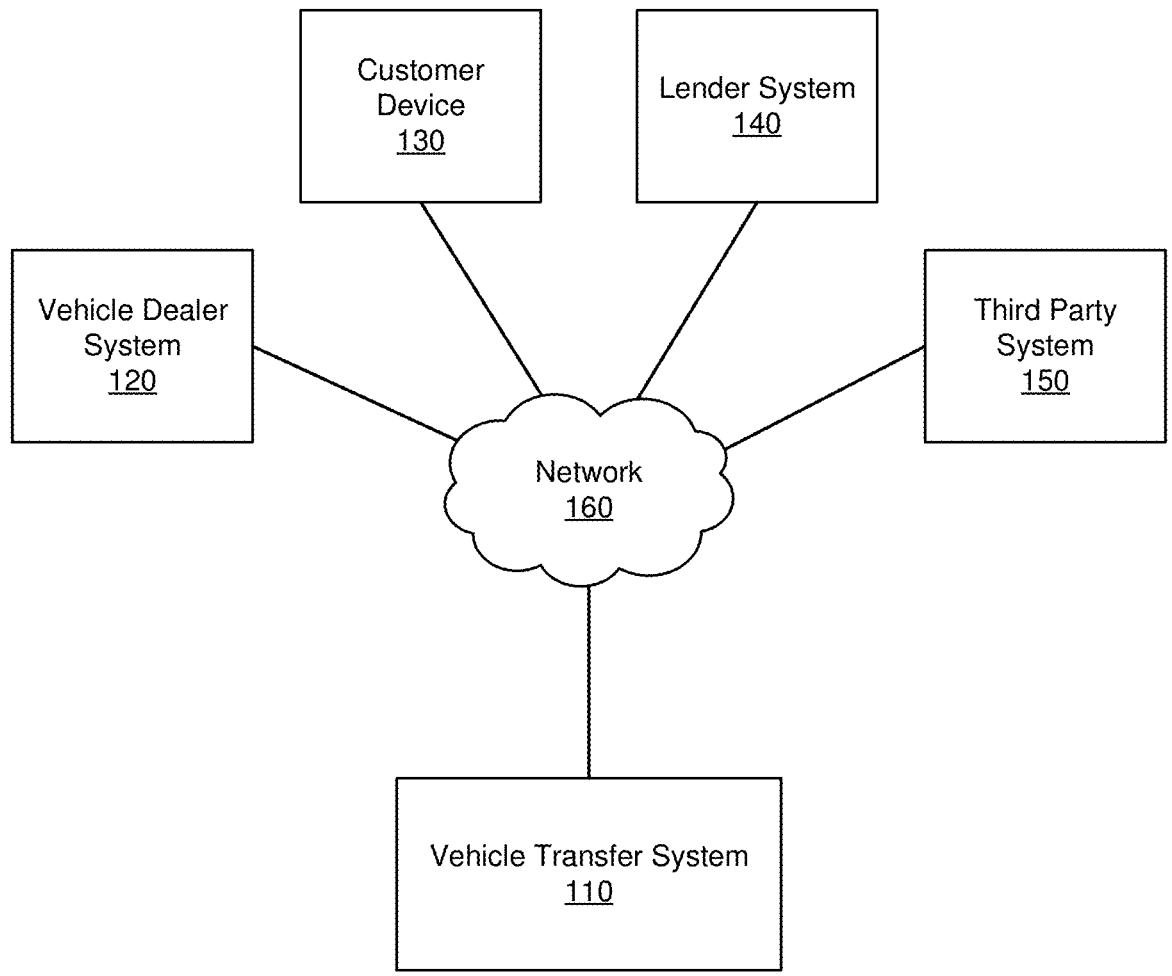

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview of the Disclosure

Many conventional vehicle dealer websites provide financing calculator tools that can calculate monthly payments on a loan or a lease for a vehicle. However, such calculator tools simply provide rough estimates of monthly payments and typically do not account for any user-specific information. For example, a payment calculator on a typical vehicle dealer's website may provide a sample loan payment based on a single annual percentage rate (APR), loan term, and down payment that cannot be adjusted. As a result, the same monthly payment estimate is provided for display to each customer who views the website, regardless of the customer's particular circumstances, such as the customer's credit score, desired loan term, desired down payment amount, and whether the customer wishes to trade in a vehicle. Furthermore, the calculator tools on traditional dealer websites simply provide non-binding estimates; in order to actually purchase or lease a vehicle from the vehicle dealer, a customer typically has to visit the dealership and complete a transaction in person with a vehicle dealer, which commonly results in a different set of loan or lease terms than what was indicated on the website's calculator tool.

In contrast to the calculator tools on traditional websites, a vehicle transfer system provides a transaction interface for display as part of a vehicle dealer's website. The transaction interface makes the vehicle dealer's website transactional, which means the customer can complete an entire vehicle transfer transaction (e.g., pay for a vehicle with cash, pay for a vehicle with a loan, or lease a vehicle) by interacting with the transaction interface without having to make an in-person visit to the vehicle dealer.

The vehicle transfer system collects information about the customer. For example, the transaction interface prompts the customer to provide biographical and identifying information, such as the customer's name, address, and birth date, and information about the customer's trade-in vehicle. The vehicle transfer system also interacts with other systems to collect information about the vehicle and additional information about the customer. For example, the system performs a web scraping process on the dealer's website to collect information about the particular vehicle being transferred and about rebates that the dealer is offering. The system may also perform calls to an application programming interface (API) provided by the vehicle's manufacturer to request general information about the vehicle, such as the vehicle's manufacturer suggested retail price (MSRP). As another example, the system may communicate with a credit reporting agency to request a credit score for the customer, or communicate with an automobile valuation service (e.g., a server that provides KELLY BLUE BOOK values) to request a value for the trade-in vehicle.

If the customer wishes to finance the transaction with a loan, the vehicle transfer system provides a loan selection interface that allows the customer to adjust loan parameters (e.g., loan term and down payment) and view different loan offers matching the selected loan parameters. The vehicle transfer system requests the loan offers from a plurality of different lender systems by sending information about both the customer and the vehicle to the lender systems. This method of selecting a loan offer provides at least two key advantages. First, unlike the estimated of loan payments generated by tools on conventional dealer websites, each of the loan offers is customized to the vehicle transfer transaction and represents an offer that the customer can accept. Second, the vehicle transfer system requests a plurality of loan offers with different sets of loan parameters (e.g., different loan terms and down payments), and the customer can use the loan selection interface to rapidly browse through the different loan offers. In contrast, conventional method of applying for a vehicle loan require the customer to specify a single set of loan parameters and only display a single loan offer matching the specified parameters.

If the customer wishes the finance the transaction with a lease, the vehicle transfer system provides a lease calculation interface that allows the customer to adjust lease parameters (e.g., down payment, lease term, and annual mileage allowance), and view a monthly loan payment for those lease parameters. The vehicle transfer system performs a leasing calculation that divides the available upfront capital for the vehicle transfer transaction into first portion that is allocated to capitalized cost reduction and a second portion that is allocated to upfront expenses. Dividing the available upfront capital in this manner is advantageous because it uses a portion of the available upfront capital to cover the upfront expenses, which means the customer does not have to make any additional out-of-pocket payments at lease signing. In contrast, a conventional lease allocates the entirety of the available upfront capital to capitalized cost reduction, which means that the customer has to pay for upfront expenses in addition to any cash down payment or vehicle trade-in that the customer was already planning to make.

System Environment

Figure (FIG. 1 illustrates an example system environment 100 for a vehicle transfer system 110, in accordance with one example embodiment. As shown in FIG. 1, the system environment 100 includes a vehicle transfer system 110, a vehicle dealer system 120, a customer device 130, a lender system 140, and a third party system 150. Although the example shown in FIG. 1 includes a single vehicle dealer system 120, customer device 130, lender system 140, and third party system 150, the system environment 100 may include multiple instances of one or more of these devices and systems 120 through 150.

The system environment also includes a network 160 through which the systems and devices 110 through 150 may communicate with each other. The network 160 may comprise any combination of local area and/or wide area networks, using both wired and/or wireless communication systems. In one embodiment, the network 160 uses standard communications technologies and/or protocols. For example, the network 160 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 160 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 160 may be represented using any suitable format, such as hypertext markup language (HTML) or extensible markup language (XML). In some example embodiments, all or some of the communication links of the network 160 may be encrypted using any suitable technique or techniques.

The vehicle transfer system 110 interacts with some or all of the other systems and devices 120 through 150 to perform a vehicle transfer transaction. As referred to herein, a vehicle transfer transaction is a financial transaction in which the right to possess and use a vehicle is transferred from a vehicle dealer to a customer in exchange for some sort of compensation. The vehicle transfer system 110 may further communicate with some or all of the other systems 120 through 150 to secure one or more forms for financing for the vehicle transfer transaction. More particularly, the vehicle transfer system 110 may, as part of the vehicle transfer transaction, provide interfaces that allow the customer to select terms for a financing agreement (e.g., a loan or a lease agreement) and formally agree to be bound by the financing agreement (e.g., sign for the loan or the lease).

The vehicle dealer system 120 is a computing system operated by a vehicle dealer that provides information about the vehicle dealer, such as contact information for the vehicle dealer, information about one or more vehicles in the possession of the vehicle dealer, and rebates being offered by the dealer. In one embodiment, the vehicle dealer system 120 is a web server that provides a publicly available website operated by the vehicle dealer. As referred to herein, a vehicle dealer is an entity that possesses or otherwise has the right to sell, lease, rent, or temporarily transfer control of a vehicle to another entity (e.g., a customer). A vehicle dealer may be a licensed vehicle dealership or vehicle manufacturer (e.g., a business entity) or a solo independent being (e.g., a human entity) that interfaces with the vehicle transfer system 100 for transferring control of a vehicle to facilitate a vehicle transfer transaction.

The customer device 130 is a computing device operated by a customer to view the information provided by the dealer system 120. The customer device 130 may be a computing device that belongs to the customer, such as a personal laptop computer, desktop computer, tablet computer, or smartphone. The customer device 130 may alternatively be a computing device that a vehicle dealer provides for customer to use. For example, the customer device 130 may be a computing device that is physically located inside a vehicle dealer in a manner that is accessible to customers, which allows a customer to view the information provided by the vehicle dealer system 120 during an in-person visit to the vehicle dealership. As referred to herein, a customer is a person or entity that seeks to possess or otherwise buy, lease, rent, or otherwise at least temporarily obtain control of a vehicle from another entity (e.g., a vehicle dealer). A customer may be a licensed vehicle dealership (e.g., a business entity) or a solo independent being (e.g., a person) that may interface with the vehicle transfer system 100 for obtaining control of a vehicle to facilitate a vehicle transfer transaction.

The lender system 140 is operated by a loan lender, banker, or other capital source that seeks to make funds available in a loan to another entity (e.g., to a customer for use in at least temporarily obtaining control of a vehicle from a vehicle dealer) with the expectation that the element of value will be repaid (e.g., within a certain amount of time, in addition to any interest and/or fees, either in increments or as a lump sum). Such a loan lender may be a licensed public or private group or a financial institution (e.g., a business entity or collection of individuals) or a solo independent being (e.g., a human entity) that may interface with Vehicle transfer system 100 for making a loan to a vehicle borrower to facilitate a vehicle transfer transaction.

The third-party system 150 provides a third party application or service that processes or provides any suitable subject matter that may be used by any other system or device in the system environment 100 to enable a vehicle transfer transaction. In one embodiment, the third party system 150 is operated by a financial institution (e.g., banks) that provides financial information or credit scores for any suitable users or vehicles of the platform. For example, the third-party system may be operated by an information management service and credit information service, such as TransUnion of Chicago, Ill., Equifax Inc. of Atlanta, Ga., Experian PLC of Dublin, Republic of Ireland, Edmunds-.com, Inc. of Santa Monica, Calif., Black Book auto valuation of Heart Business Media Corporation of New York, N.Y., Kelley Blue Book auto valuation of Cox Automotive of Atlanta, Ga., Plaid Technologies, Inc. of San Francisco, Calif., Twilio of San Francisco, Calif., and the like, from which data may be collected by any suitable data hub or data management system ("DMS") and shared with the vehicle transfer system 110).

As other examples, the third-party system 150 may be operated by a risk management research entity (e.g., LEXISNEXIS GROUP of Dayton, Ohio), an ancillary goods/services provisioning entity (e.g., IASDIRECT.com and/or any other suitable entity that may provide vehicle service contract ("VSC") products and/or finance and insurance ("F&I") products and/or guaranteed auto protection ("GAP") products and/or tire and wheel coverage ("T&W") products to another entity of the system environment 100), backup and recovery provider entities (e.g., EVAULT, a SEAGATE COMPANY of San Francisco, Calif.), an underwriter, a loan servicer, a financial transaction electronic network (e.g., Automated Clearing House ("ACH") that may at least partially manage the National Automated Clearing House Association ("NACHA") of Washington, D.C., and/or UCB), electronic signature facilitator entities (e.g., DOCUSIGN of San Francisco, Calif.), a loan agent, an investor, a social network that provides any suitable connection information between various parties, a government agency/regulator, a licensing body, a third party advertiser, an owner of relevant data, a seller of relevant goods/materials, a software provider, a maintenance service provider, or a scheduling service provider.

Although the system environment 100 and the systems and devices 110 through 150 are described herein with respect to the transfer of a vehicle from a dealer to a customer, the system environment can alternatively be used to transfer a different type of good or service (e.g., a real estate property, business supply, etc.) according to one or more of the concepts described in this disclosure.

Example Vehicle Transfer System

Figure 2:
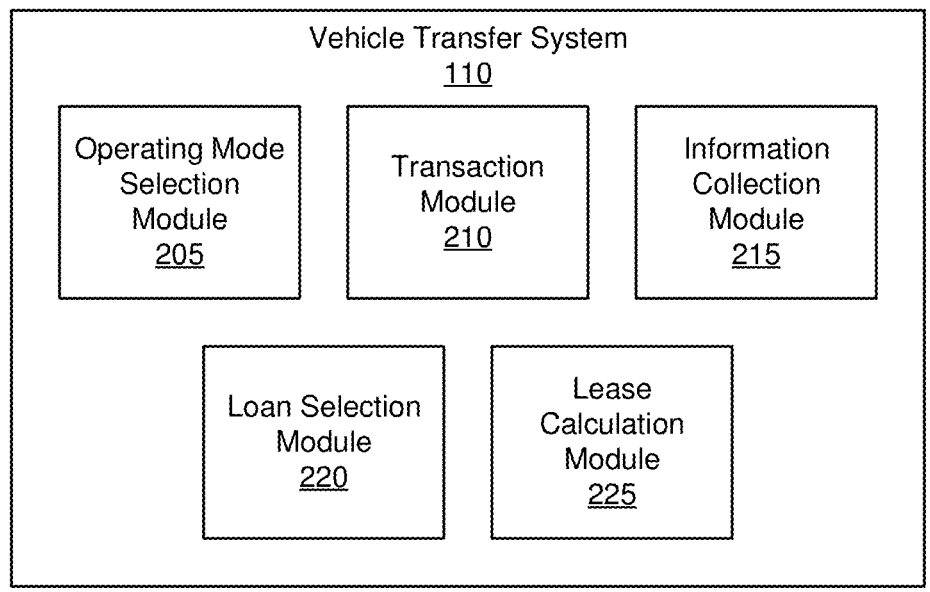
FIG. 2 is a block diagram illustrating components of the vehicle transfer system, according to one embodiment.

FIG. 2 is a block diagram illustrating components of the vehicle transfer system 110, according to one example embodiment. In the embodiment shown in FIG. 2, the vehicle transfer system 110 includes an operating mode selection module, a transaction module 210, an information collection module 215, a loan selection module 220, and a lease calculation module 225. In other embodiments, the vehicle transfer system 110 may include additional, fewer, or different components, and the functionality described herein may be distributed among the components of the vehicle transfer system 110 in a different manner. It is noted that the modules described herein may be configured to execute their functionality on a computing system, for example, such as one having components of the architecture described with reference to FIG. 7.

The operating mode selection module 205 receives information indicating whether a customer interacting with the vehicle transfer system 110 is in the presence of the dealer and selects an operating mode for the customer's vehicle transfer transaction. In one embodiment, the operating mode selection module 205 selects one of three operating modes based on the received information: an assisted mode, which is selected when the customer is in the physical presence of a dealer; a remote-assisted mode, which is selected when the customer is engaged in communication with a dealer (e.g., via phone, video conference, text messaging, or email) but is not in the physical presence of the dealer; and an unassisted mode, which is selected when the customer neither in the physical presence of a dealer nor engaged in real-time communication with a dealer. An example process for selecting the operating mode for a vehicle transfer transaction is described in more detail below with reference to FIG. 4A.

The transaction module 210 provides a transaction interface that facilitates a vehicle transfer transaction between a customer and a dealer. The transaction interface prompts the customer to provide information, such as biographical information and credit information, and the information is sent from the device displaying the transaction interface (e.g., the customer device 130) to the vehicle transfer system 110. Other components of the vehicle transfer system 110, such as the information collection module 215, the loan selection module 220, and the lease calculation 225 receive and use the information to perform other functions of the vehicle transfer system 110.

The information collection module 215 interacts with other systems in the system environment 110 to collect information that is not provided as user input to a user interface. The collected information may be any information that is used to facilitate a vehicle transfer transaction, such as information about a make and model of a vehicle (e.g., the vehicle's MSRP), information about a particular vehicle that is available to be transferred (e.g., the vehicle's mileage, vehicle identification number, make and model, trim options, and asking price), or additional information about a customer (e.g., a credit score or some other measure of the customer's creditworthiness).

The information collection module 215 can use a variety of different techniques to collect information for a vehicle transfer transaction. In one embodiment, the information collection module 215 requests information by querying an application programming interface provided by a third-party system 150. For example, the module 215 may query an application programming interface (API) of a vehicle manufacturer to request information about a particular make and model of a vehicle. As another example, the module 215 may receive biographical information about a customer via the user interface provided by the transaction module 210 and provide the biographical information to an API of a credit reporting agency in order to request the customer's credit score. In one embodiment, the information module 215 additionally or alternatively collects information by scraping the content of one more websites. For example, the module 215 scrapes a dealer's website (e.g., a website provided by the dealer system 120) to collect information about rebates offered by the dealer or information about one or more vehicles that the dealer currently has in its possession.

The loan selection module 220 provides a loan selection interface that presents loan offers from a plurality of different lenders. In one embodiment, the loan selection module 220 receives loan offers from a plurality of lenders and generates a loan array that contains loan offers for a plurality of different loan terms and down payment amounts. The loan selection interface includes graphical elements, such as sliders, that allow the customer to input a desired loan term and down payment amounts. After receiving the customer's desired loan term and down payment amount, the loan selection module 220 accesses the loan array to identify loan offers matching the desired loan term and down payment amount and displays the identified loan offers. The operation of the loan selection module 220 is described in further detail below with reference to FIGS. 5A-5H.

The lease calculation module 225 receives lease parameters from a plurality of different sources, performs a lease calculation based on the lease parameters, and provides the results of the lease calculation for display in a lease calculation interface. The lease calculation interface also allows a customer to adjust certain lease parameters. If the customer adjusts one or more lease parameters, the lease calculation performs an updated lease calculation and presents the results of the updated lease calculation in the lease calculation interface. In one embodiment, the lease calculation solves for a balancing point between the total upfront capital that is available to the customer and the total amount that the customer is to pay upfront when formally agreeing to the lease (e.g., at lease signing). The operation of the lease calculation module 225 is described in further detail below with reference to FIGS. 6A-6D.

Performing a Vehicle Transfer Transaction

Figure 3A:
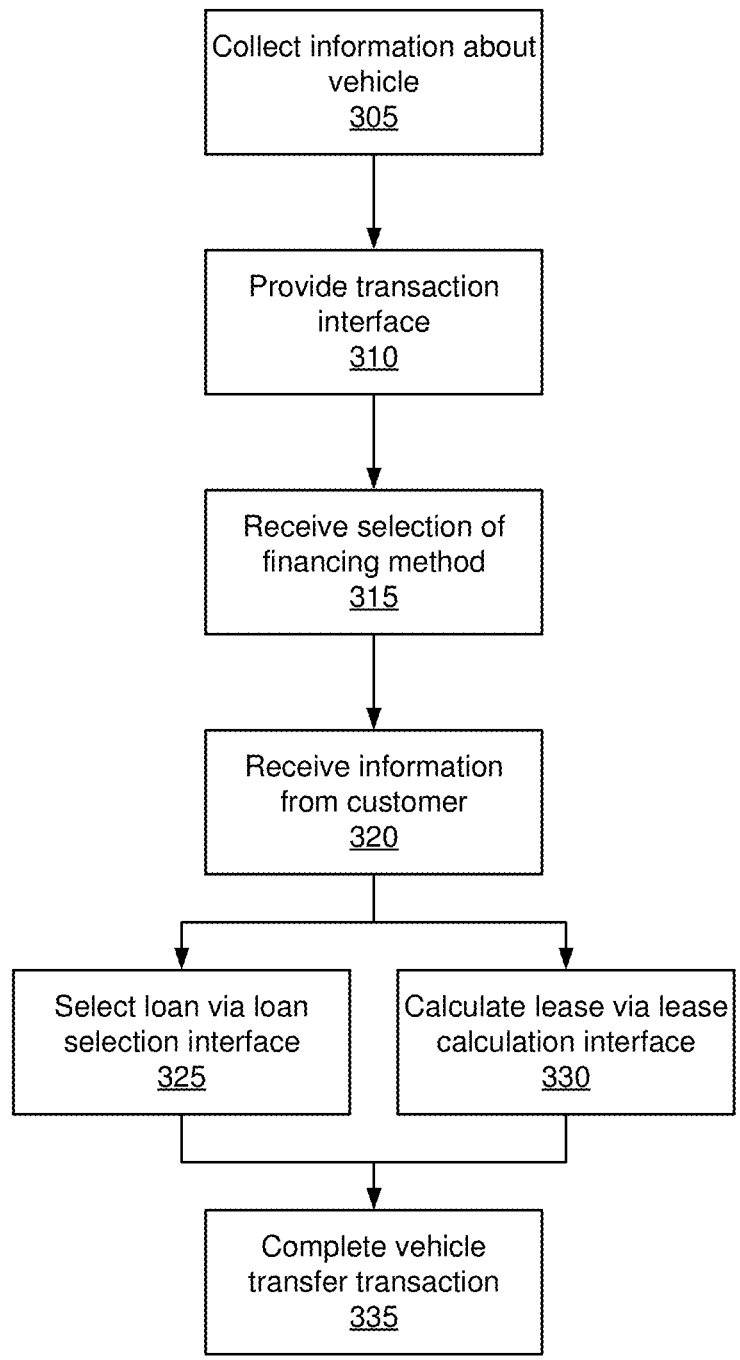
FIG. 3A is a flow chart illustrating a process for performing a vehicle transfer transaction with the vehicle transfer system, according to one embodiment.
Figure 3B:
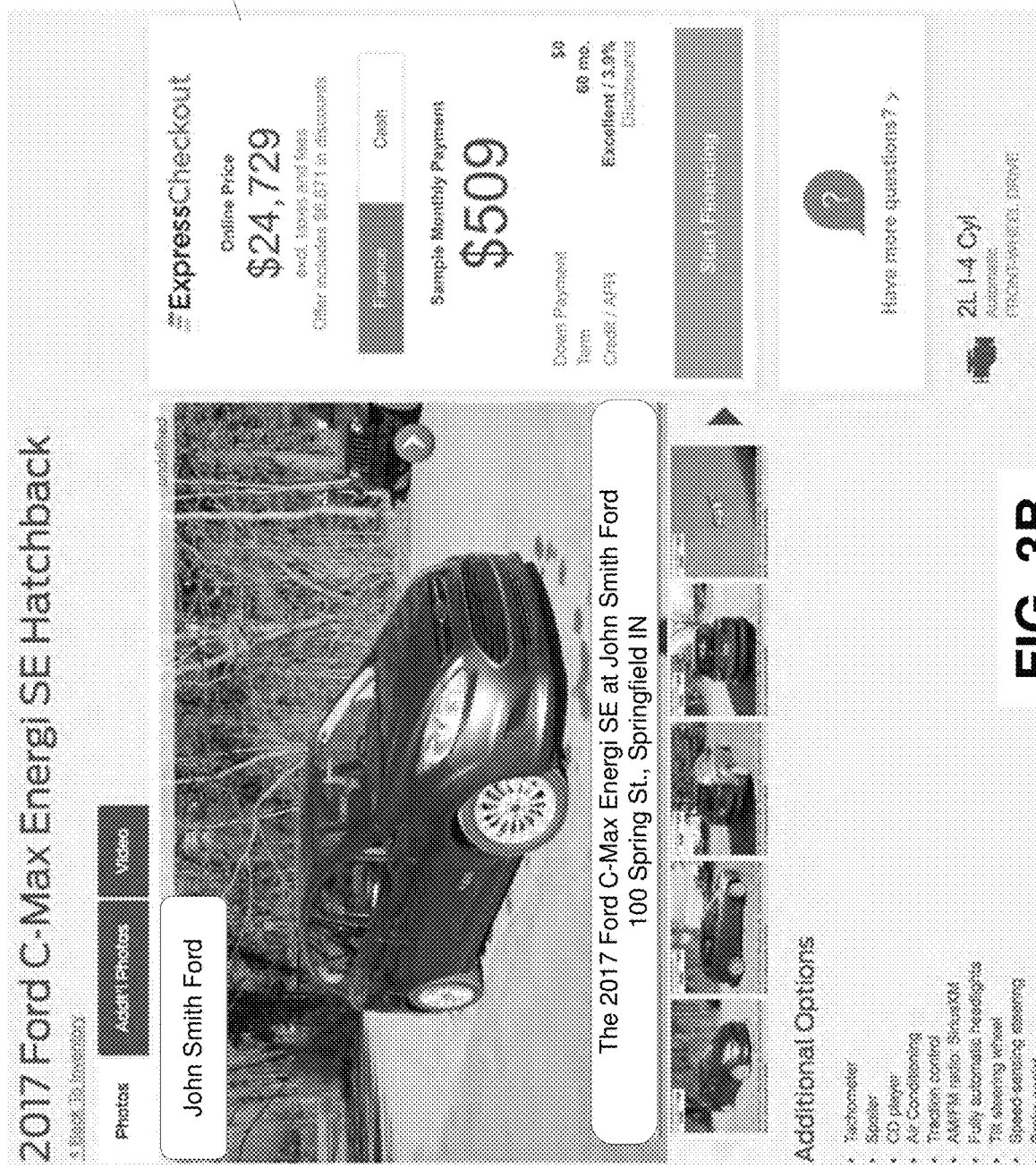
Figure 3C:
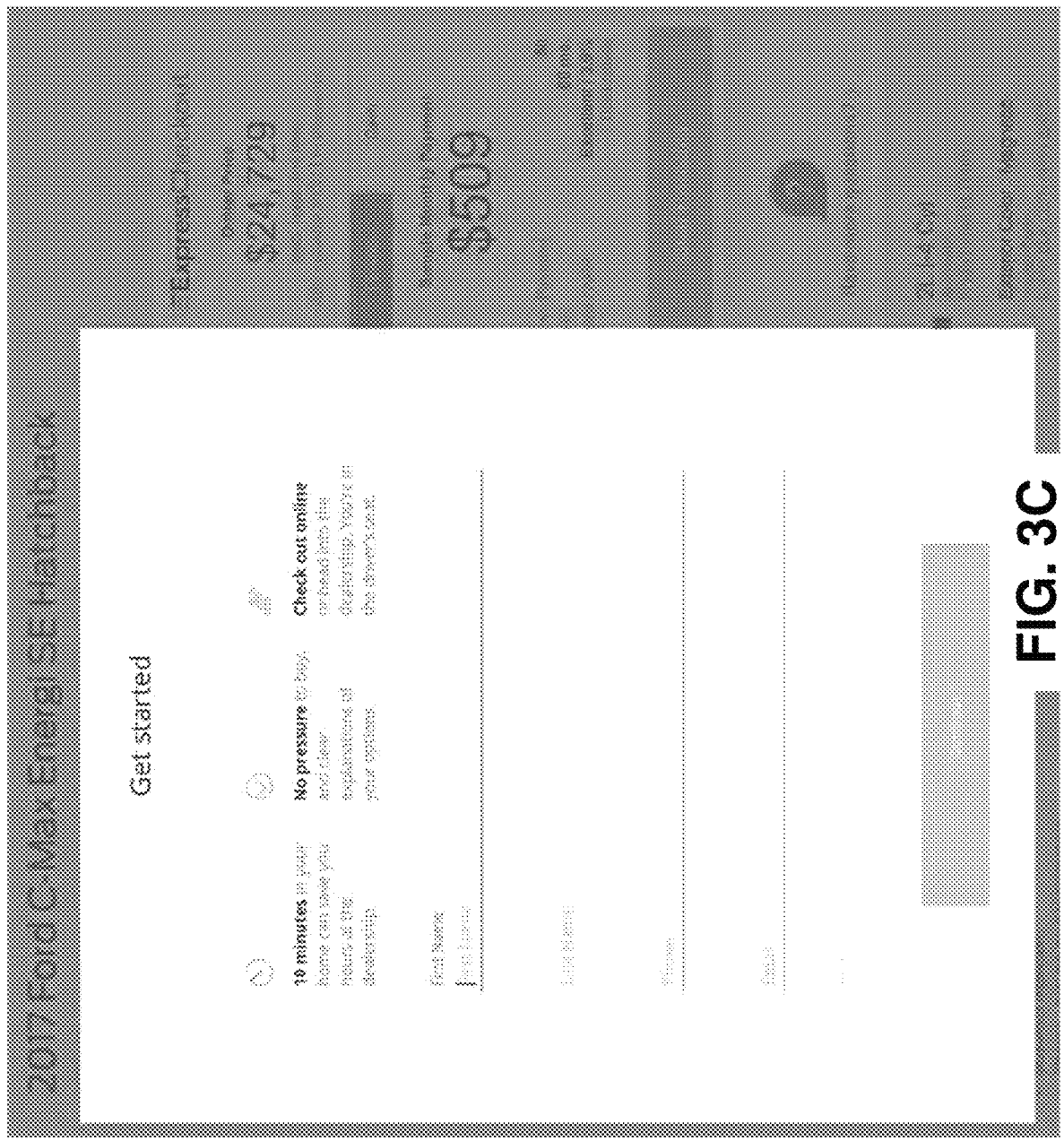
Figure 3D:
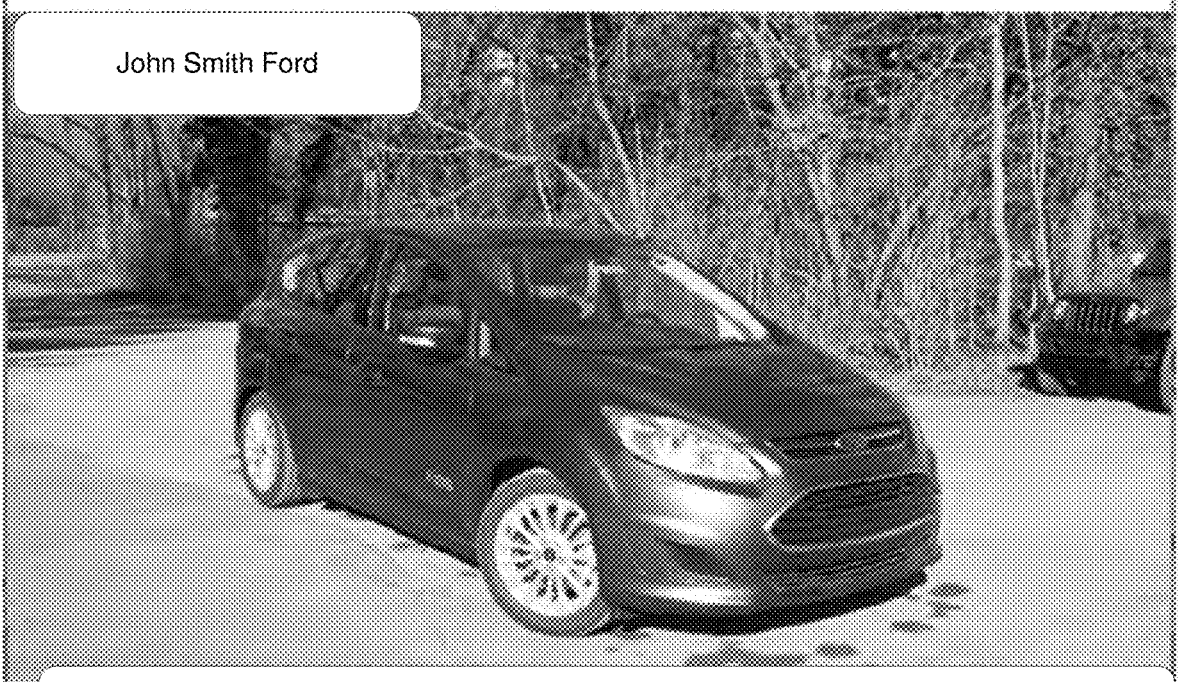

FIG. 3A is a flow chart illustrating a process 300 for performing a vehicle transfer transaction with the vehicle transfer system 110, according to one embodiment. In other embodiments, the process 300 may include additional, fewer, or different steps, and some of the steps shown in FIG. 3A may be performed concurrently or in a different order. FIGS. 3B-3D are example screenshots of the transaction interface, according to one embodiment. For ease of discussion, the process 300 shown in FIG. 3A will be described in conjunction with the example screenshots shown in FIGS. 3B-3D.

The vehicle transfer system 110 collects 305 information about the vehicle to be transferred. The collected information can include any information about the vehicle that is used over the course of the vehicle transfer transaction, such as the vehicle's MSRP, the vehicle dealer's asking price for the vehicle, any rebates that are applicable to the vehicle, the vehicle identification number (VIN) of the vehicle, and the mileage of the vehicle.

In one embodiment, the information is collected 305 by the information collection module 215. For example, the information collection module 215 performs a web scraping process on a vehicle dealer's website to collect information about rebates offered by the dealer (e.g., the amount of the rebate, whether the rebate is available for a loan, a lease, or both, the vehicles for which the rebate is available, and other conditions of the rebate), and information about particular vehicles that are available on the vehicle dealer's website (e.g., the vehicle's mileage, vehicle identification number, make and model, trim options, and asking price). In one embodiment, the vehicle dealer's website maintains separate web pages for each available vehicle and for available rebates, and the web scraping process collects information from one or more of these web pages.

As another example, the information collection module 215 queries an API provided by the vehicle manufacturer or a third party to request general information for the vehicle's make and model, such as the vehicle's MSRP. In one embodiment, the information collection module 215 submits the API call to request vehicle information from a vehicle manufacturer when the customer (e.g., via the customer device 130) views a web page for the vehicle on the vehicle dealer's website. The information collection module 215 may also query an API provided by the vehicle manufacturer, the vehicle dealer, or a third party to request rebates that are applicable to the vehicle. For instance, the information collection module 215 submits an API call with the VIN of a vehicle, and the API returns a data structure (e.g., in JSON format) containing information about each rebate applicable to the vehicle. As still another example, the information collection module 215 can receive information from another system, such as a vehicle dealer system 120, through a direct data transfer (e.g., through the file transfer protocol (FTP)). In one embodiment, the vehicle dealer system 120 sends the vehicle dealer's current vehicle inventory to the information collection module 215 via an FTP transfer at regular intervals (e.g., once per day at a predetermined time of day, once per week at a predetermined time on a predetermined day of the week, etc.).

The vehicle transfer system 110 provides 310 a transaction interface. In one embodiment, the transaction module 210 provides 310 the transaction interface as part of a web page for the vehicle that is provided by the vehicle dealer system 120. In other words, the web page for the vehicle includes the transaction interface, which is provided by the transaction module 210 of the vehicle transfer system 110, and also includes information about the vehicle that is provided by the vehicle dealer via the dealer system 120.

A web page containing an example of a transaction interface is shown in FIG. 3B. In the example shown in FIG. 3B, the transaction interface 340 displays a portion of the information that was collected 110 by the vehicle transfer system 110. In particular, the example transaction interface displays the dealer's asking price for the vehicle and the total amount of the rebates available for the vehicle. In the example shown in FIG. 3B, the transaction module 210 also computes a preliminary estimate of monthly loan payments for the vehicle based on the information that was collected 205 about the vehicle and on a default set of financing parameters (e.g., for the loan estimate shown in FIG. 3B, the default set of financing parameters specify a down payment of $0, a loan term of 60 months, and that the customer's credit rating can be characterized as "excellent"). The estimated loan payments and default financing parameters are then provided for display as part of the transaction interface. Although not included in the example shown in FIG. 3B, the transaction module 210 may additionally or alternatively compute a preliminary estimate of monthly lease payments for the vehicle and provide the estimated lease payments for display in the transaction interface.

The vehicle transfer system 110 receives 315 a selection of a financing method for the vehicle transfer transaction. In one embodiment, the transaction module 210 facilitates three financing methods: a lease, a loan, or an upfront cash payment for the full price of the vehicle. In this embodiment, the transaction module 210 may allow the vehicle dealer to enable a subset of the three financing options for a particular vehicle. For instance, in the example shown in FIG. 3B, the cash and loan options are enabled, but the lease options is disabled. If multiple options are enabled for a vehicle, the transaction interface for the vehicle allows the customer to select one of the enabled financing options, and the transaction module 210 receives 315 the customer's selection. If a single financing option is enabled for a vehicle, then the enabled option automatically becomes the selected option.

The vehicle transfer system 110 receives 320 information from the customer. For example, the transaction module 210 provides one or more screens as part of the transaction interface that prompt the customer to provide biographic information (e.g., the customer's name and address), information about the customer's creditworthiness (e.g., the customer's employment information and housing expenses), and information about a vehicle that the customer is trading in (e.g., the make, model, and year of the trade-in vehicle, the number of miles on the trade-in vehicle's odometer, and other information about the condition of the trade-in vehicle). An example screen for providing biographic information is shown in FIG. 3C.

The vehicle transfer system 110 may also use some of the received information to request additional information. For example, the information collection module 205 may provide information about the trade-in vehicle to a third party system 150 operated by an automobile valuation service (e.g., a server that provides Kelley Blue Book values for vehicles) to request a valuation for the trade-in vehicle. As another example, the information collection module 205 may provide biographical information about the customer to a third-party system 150 operated by a credit information service (e.g., TransUnion, Equifax, Experian) to request a credit score (or some other measure of creditworthiness) of the customer.

The vehicle transfer system 110 provides an interface that allows the customer to customize the financing method by adjusting financing parameters via an interface provided by the vehicle transfer system 110. In particular, if the transaction is to be financed with a loan, the vehicle transfer system 110 selects 320 a loan based on the customer's interactions with a loan selection interface provided by the system 110. The loan selection interface may allow the customer to adjust parameters such as loan term and down payment percentage and then display loan offers matching the parameters. If the transaction is to be financed with a lease, the vehicle transfer system 110 calculates 325 a lease based on the customer's interactions with a lease calculation interface provided by the system 110. The lease calculation interface may allow the customer to adjust parameters such as down payment amount and miles driven per year, and then display the results of a lease calculation that is performed based on the parameters. Example processes for selecting 320 a loan and calculating 325 a lease are described in further detail below with reference to FIGS. 5A and 6A, respectively.

Figure 3G:

After the customer has finished adjusting the parameters, the vehicle transfer system 110 completes 330 the vehicle transfer transaction. In one embodiment, the transaction module 210 presents a summary interface to the customer (e.g., to be displayed on the customer device 130). An example summary interface is shown in FIGS. 3D-3F. As shown in FIGS. 3D-3F, the summary interface summarizes the terms of the vehicle transfer transaction, such as pricing information for the vehicle being transferred, rebates that are being applied, taxes and fees for the transaction, a total cost of the transaction, and how the transaction will be financed. The summary interface also includes a graphical element (e.g., the "I'm ready to sign" button) that allows the customer to formally agree to the terms of the vehicle transfer transaction. If the customer formally agrees to the transaction, the transaction module 210 may present a confirmation interface that confirms the transaction and provides the customer with details on how to take possession of the vehicle. An example confirmation interface is shown in FIGS. 3G-3H.

Selection of Operating Mode

Figure 4A:
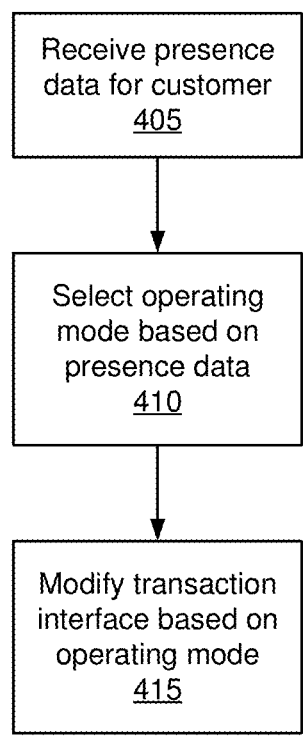
FIG. 4A is a flow chart illustrating a process for selecting an operating mode for a vehicle transfer transaction, according to one embodiment.

FIG. 4A is a flow chart illustrating a process 400 for selecting an operating mode for a vehicle transfer transaction, according to one embodiment. In other embodiments, the process 400 may include additional, fewer, or different steps, and the steps shown in FIG. 4A may be performed in a different order. The first two steps 405, 410 of the process 400 are described below as being performed by the operating mode selection module 205. However, in other embodiments, these steps 405, 410 of the process 400 may be performed by a different component of the vehicle transfer system 110 or by a different device in the system environment. For example, these steps of the process 400 may instead be performed on the customer device 120.

The operating mode selection module 205 receives 405 presence data for a customer. As referred to herein, presence data is any data that can be used to determine whether the customer is inside a vehicle dealership or whether the customer is engaged in communication with a vehicle dealer. Examples of presence data include, for example, a device identifier of the customer device 130 (e.g., a MAC address), an IP address used by the customer device to communicate with other systems on the network 160, location information for the customer device 130 (e.g., latitude-longitude coordinates from a GPS receiver on the customer device 130), user input received from the customer via the customer device 130 (e.g., the customer's response to an interface prompt that asks the customer to indicate whether he or she is presently inside a vehicle dealership or communicating with a vehicle dealer), or an indication that a real-time communication feature (e.g., a text chat feature, a voice chat feature, or a video chat feature) is being used on the customer device 130 to facilitate communication between the customer and the vehicle dealer.

After receiving 405 one or more items of presence data, the operating mode selection module 205 selects 410 an operating mode based on the presence data. As noted above, the operating mode selection module 205 can select one of three operating modes: an assisted mode, a remote-assisted mode, and an unassisted mode. The operating mode selection module 205 selects 410 the assisted mode if the presence data indicates that the customer device 130 in a location associated with a vehicle dealer. The module 205 selects 410 the remote-assisted mode if the presence data indicates that the customer not in a location associated with a vehicle dealer but is in real-time communication with a vehicle dealer. Finally, the module 205 selects 410 the unassisted mode if the presence data indicates that the customer is neither in a location associated with a vehicle dealer nor engaged in real-time communication with a vehicle dealer.

In one embodiment, the operating mode selection module 205 first uses the presence data to determine whether the customer is in a location associated with a vehicle dealer. If the presence data indicates that the customer is in a location associated with a vehicle dealer, then the operating mode selection module 205 selects 410 the assisted mode. For example, if the operating mode selection module 205 received 405 an IP address for the customer device 130, then the module 205 determines whether the IP address belongs to a vehicle dealer. If the IP address belongs to a vehicle dealer, then the customer device 130 is likely to be accessing the vehicle transfer system 110 from the physical premises of the vehicle dealer. As another example, if the operating mode selection module 205 received 405 a device identifier for the customer device 130, then the module 205 determines whether the device identifier is associated with a vehicle dealer. As still another example, if the operating mode selection module 205 received 405 a location for the customer device 130, then the module 205 determines whether the location is inside a geofence surrounding a vehicle dealer's location.

If the presence data indicates that the customer is not in a location associated with a vehicle dealer, then operating module selection module 205 selects 410 between the remote-assisted mode and the unassisted mode based on whether the presence data indicates that the customer is engaged in real-time communication with a vehicle dealer. For example, the presence data may additionally include an indication that a real-time communication feature is being used on the customer device 103 to facilitate communication between a customer and a vehicle dealer.

After an operating mode is selected 410, the vehicle transfer system 110 may modify 415 one or more screens of the transaction interface based on the operated mode. In one embodiment, the operating mode selection module 205 configures the transaction module 210 to operate in the selected operating mode, and the transaction module 210 presents different transaction interfaces when operating in different operating modes. In the assisted mode, it is assumed that both the vehicle dealer and customer both have physical access to the customer device 130, so the transaction module 210 may modify the transaction interface to include dealer-use-only fields to input custom values for rebate amounts and selling price (e.g., resulting from an in-person negotiation between the customer and the vehicle dealer) or a custom amount for a trade-in value (e.g., resulting from the vehicle dealer performing an in-person inspection of the customer's trade-in vehicle).

In both the assisted mode and the remote-assisted mode, it is assumed that the vehicle dealer is available to explain various details of the transaction to the customer and to help the customer fill in the fields that are displayed in the transaction interface. Thus, when operating in one of these modes, the transaction module 210 may modify the transaction interface to display a larger number of input fields on fewer screens (e.g., a "power user" mode), to display fewer educational screens that provide textual explanations of different portion of the transaction, and to display fewer follow-up steps to the customer (e.g., because the vehicle dealer can simply provide verbal instructions to perform these follow-up steps).

Apart from the modifications noted above, the transaction module 210 may make additional modifications to the transaction interface when operating in the remote-assisted mode. For example, the transaction module 210 may omit follow-up instructions that can be performed via remote communication with a vehicle dealer, such as scheduling an in-person appointment at the vehicle dealership, but display follow-up steps that involve physical interaction with the dealer, such as bringing hard copy documents to the vehicle dealership.

In the unassisted mode, it is assumed that the customer is not in communication with the dealer and is not inside the dealership. As a result, the transaction module 210 modifies the transaction interface to make the interface more user-friendly when operating in the unassisted mode. For instance, the transaction module 210 modifies the interface to include fewer input fields in each screen to avoid overwhelming the customer, more explanatory text and graphics, and more follow-up steps. Furthermore, the transaction module 210 omits the dealer-use-only fields described above; instead, the trade-in value, selling price, and rebate amounts are collected in the manner described above with reference to the information collection module 215 and the process 300 of FIG. 3A.

This process 400 of selecting an operating mode may be performed multiple times throughout a vehicle transfer transaction and may lead to a change in operating mode while a transaction is in progress. In one embodiment, the vehicle transfer system 110 provides a customer with the ability to save his or her progress when making a transaction so the customer can return later to complete the transaction. For example, the vehicle transfer system 110 may store data related to the transaction as part of a user account associated with the customer. In this embodiment, the process 400 for selecting an operating mode is performed each time the customer returns to the transaction by resuming interaction with the vehicle transfer system 110.

For example, the customer may begin the vehicle transaction during an in-person visit to a vehicle dealership. Upon starting the vehicle transaction during the in-person visit, the vehicle transfer system 110 performs the process 400 and selects 410 the assisted mode. As a result, the vehicle dealer can the dealer-use-only fields that are provided in the assisted mode to input custom values for rebates, selling price, and trade-in value. The customer may then save the transaction on the vehicle transfer system 110 and resume the transaction from his or her home computer several days later. For example, the vehicle transfer system 110 may provide the customer with an interface that includes a link to resume the transaction along with a timer representing the length of time the transaction data will be stored on the system 110. An example of this interface is shown in FIG. 4B. Although the example shown in FIG. 4B states that the transaction data will be stored on the system 110 for a 10-day time window, in other embodiments the system 110 may store the transaction data for a shorter length of time (e.g., 5 days, 1 day, 6 hours, 1 hour) to provide additional incentive for the customer to resume and complete the transaction. Upon resuming the transaction, the vehicle transfer system 110 performs the process 400 again and selects 410 the unassisted mode, and the customer completes the transaction in the unassisted mode.

The ability to switch between different operating modes during the course of a single vehicle transfer transaction is advantageous because it allows portions of the transaction to be performed with the benefit of having a vehicle dealer present (e.g., the customer can negotiate for higher rebate amounts or a lower selling price, and the vehicle dealer can inspect the customer's trade-in vehicle to arrive at a more accurate trade-in value), and it also allows the customer to complete other portions of the transaction alone (e.g., finalizing and formally agreeing to the transaction), without the social pressure of being in the physical presence of a vehicle dealer.

Loan Selection Interface

Figure 5A:
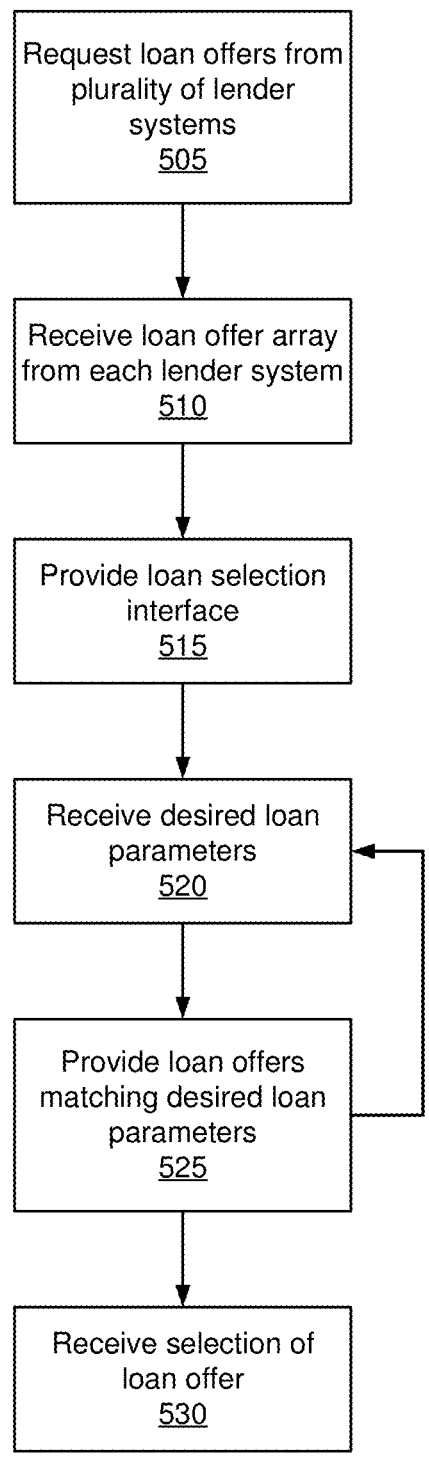
FIG. 5A is a flow chart illustrating a process for providing a loan selection interface that presents loan offers from a plurality of different lenders, according to one embodiment.
Figure 5G:
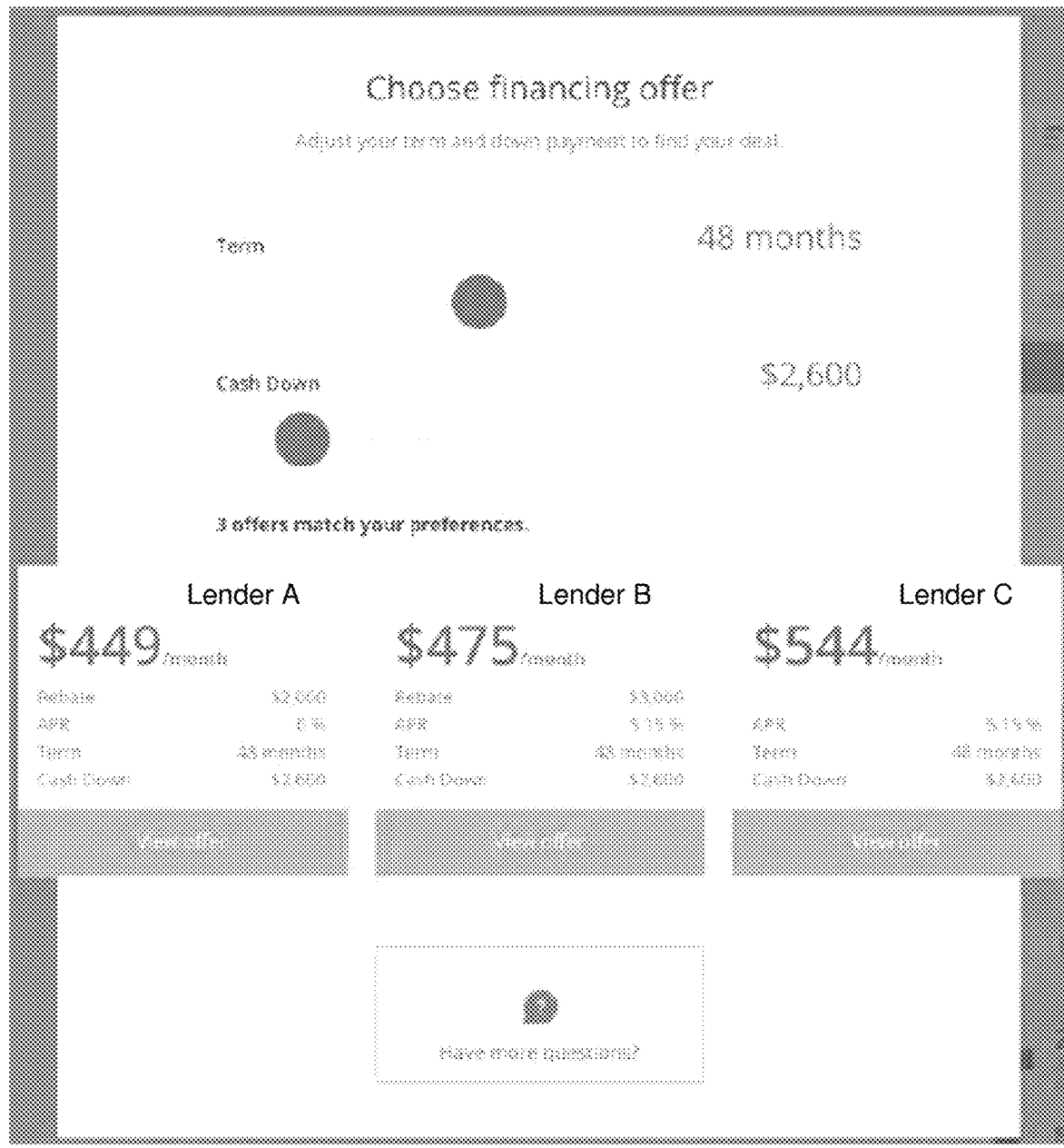
Figure 5H:
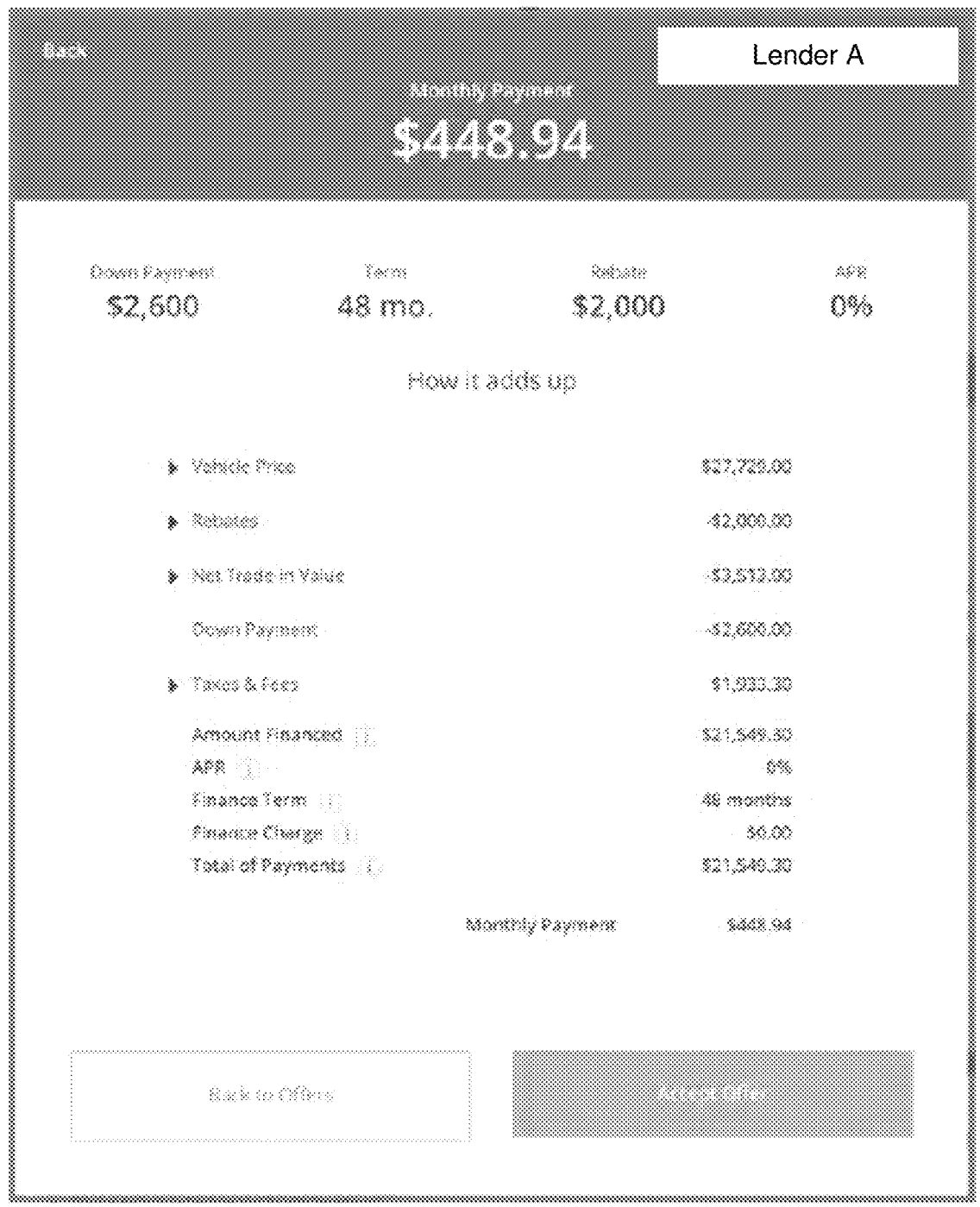

FIG. 5A is a flow chart illustrating a process 500 for providing a loan selection interface that presents loan offers from a plurality of different lenders, according to one embodiment. In other embodiments, the process 500 may include additional, fewer, or different steps, and the steps shown in FIG. 5A may be performed in a different order. The process 500 is described below as being performed by the loan selection module 220. However, in other embodiments, the process 500 may be performed by a different component of the vehicle transfer system 110 or by a different device in the system environment. FIGS. 5B-5E illustrate example data structures for providing the loan selection interface, and FIGS. 5F-5H are example screenshots of the loan selection interface, according to various embodiments. For ease of discussion, the process 500 shown in FIG. 3A will be described in conjunction with the example data structures shown in FIGS. 5B-5E and the example screenshots shown in FIGS. 5F-5H.

The loan selection module 220 requests 505 loan offers from a plurality of lender systems 140. In one embodiment, the loan selection module 220 generates the request by combining information about the customer, about the vehicle to be transferred, and other information about the transaction. For example, the loan selection module 220 receives information about the vehicle and information about applicable rebates that was collected by performing a web scraping process on the vehicle dealer's website. Similarly, the loan collection module 220 receives information about the customer that the customer provided as input to the transaction interface. The loan collection module 220 may additionally receive a measure of the customer's creditworthiness from a third-party server 150 operated by a credit reporting agency or a self-reported credit range provided by the customer (e.g., as input to the transaction interface). After generating the request, the loan selection module 220 sends the request to the plurality of lender systems 140. The lender systems 140 are configured to send a loan offer array to the vehicle transfer system 110 in response to receiving the request for loan offers.

The loan selection module 220 receives 510 a loan offer array from each of the lender systems 140. As referred to herein, a loan offer array is a data structure that stores a plurality of offers. Each loan offer in the loan offer array includes a loan rate and one or more loan parameters, such as the loan term and down payment amount. Examples of loan offer arrays received from three different lenders are shown in FIGS. 5B-5D. In these examples, each loan offer array is a two-dimensional matrix where each cell stores the loan rate, a first index for each cell represents the loan term, and a second index for each cell represents the down payment percentage. In other embodiments, the loan offer array may have a different structure.

In some embodiments, the loan selection module 220 generates an aggregated loan offer array that combines the one or more of the loan offer arrays into a single array. In one embodiment, each cell of the aggregated loan offer array stores the loan offer having the lowest loan rate for the corresponding set of loan parameters. For example, in the aggregated loan offer array shown in FIG. 5E, each cell stores the lowest loan rate and corresponding lender for the loan term and down payment percentage represented by the indices for the cell. In another embodiment, each cell in the aggregated loan offer array stores a plurality of loan offers that each have the corresponding set of loan parameters. This is advantageous, for example, because the loan selection module 220 can later access a single array (rather than each individual loan offer array) to identify every loan offer having a particular set of loan parameters.

The loan selection module 220 provides 515 a loan selection interface for display to the customer on the customer device 130. The loan selection interface includes one or more interface elements that allow the customer to select one or more desired loan parameters. Screenshots of an example loan selection interface are shown in FIGS. 5F and 5G. This example loan selection interface includes two sliders that allow the customer to select two desired loan parameters: a desired loan term (in months) and a desired down payment amount (in dollars). In the first screenshot shown in FIG. 5F, the sliders are set to default values that specify a loan term of 36 months and a down payment of $0, and the interface also displays the loan offers matching these default values. In the second screenshot shown in FIG. 5G, the customer has adjusted the sliders to select a loan term of 48 months and a down payment of $2,600.

The loan selection module 220 receives 520 a set of desired loan parameters from the customer device 130 based on the customer's selections in the interface elements in the loan selection interface. For example, after the customer adjusts the sliders as shown in FIG. 5G, the loan selection module 220 receives 520 a set of desired loan parameters specifying a loan term of 48 months and a down payment of $2,600.

After receiving 520 a set of desired loan parameters, the loan selection module 220 provides 525 one or more loan offers that match the desired loan parameters for display to the customer as part of the loan selection interface. In an embodiment where the loan selection module 220 generated an aggregated loan offer array, the loan selection module 220 accesses the aggregated loan offer array at the indices corresponding to the desired loan parameters to identify one or more loan offers having the desired loan parameters and provides 525 the identified loan offers for display.

After the loan offers are displayed to the customer, the customer may adjust the interface elements to select different desired loan parameters. In this case, the loan selection module 220 receives 520 a second set of desired loan parameters (e.g., containing at least one parameter with a different value than in the previous set of desired loan parameters) and provides 525 one or more different loan offers that match the second set of desired loan parameters.

The customer may alternatively select one of the displayed loan offers, in which case the loan selection module 220 receives 530 the customer's selection of the loan offer. In one embodiment, each loan offer is displayed with a "view offer" button, as shown in the examples illustrated in FIGS. 5F and 5G, and the customer selects a loan offer by selecting the "view offer" option for the loan offer to display a loan summary screen (e.g., as shown in FIG. 5H), and then selecting an "accept offer" option on the loan summary screen.

Lease Calculation Interface

Figure 6A:
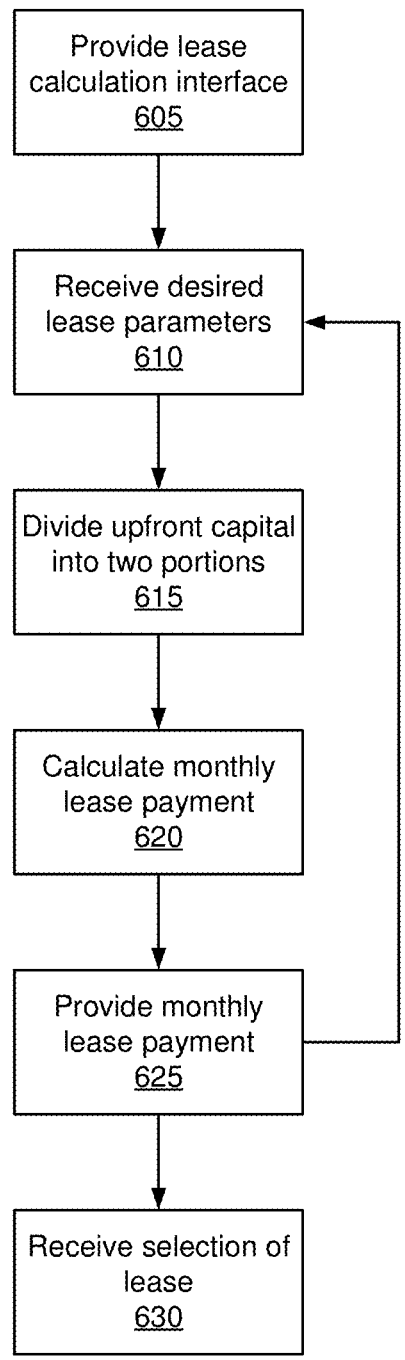
FIG. 6A is a flow chart illustrating a process for performing a lease calculation and presenting the results in a lease calculation interface, according to one embodiment.

FIG. 6A is a flow chart illustrating a process 600 for performing a lease calculation and presenting the results in a lease calculation interface, according to one embodiment. In other embodiments, the process 600 may include additional, fewer, or different steps, and the steps shown in FIG.

Figure 6B:
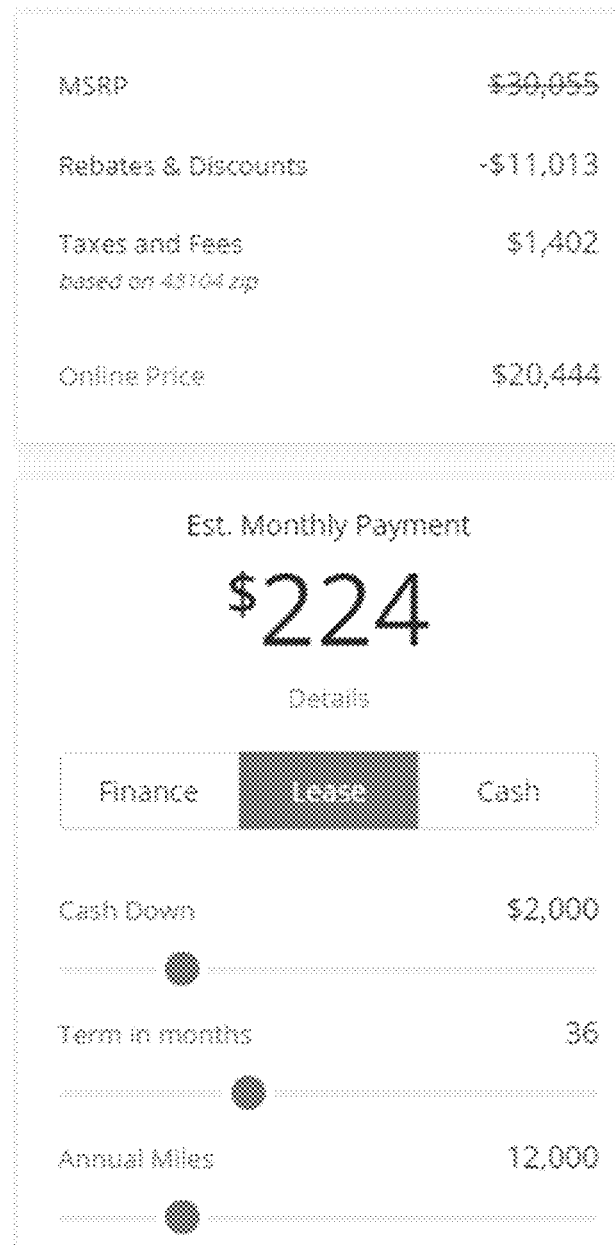
Figure 6C:
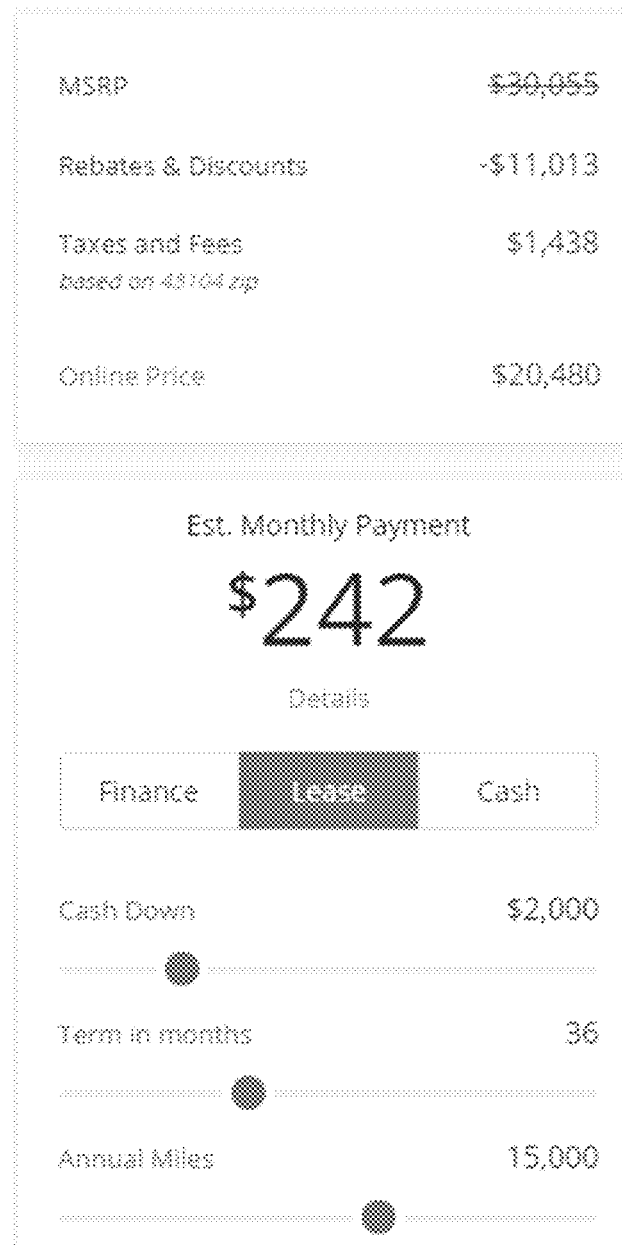

6A may be performed in a different order. The process 600 is described below as being performed by the lease calculation module 225. However, in other embodiments, the process 600 may be performed by a different component of the vehicle transfer system 110 or by a different device in the system environment. FIGS. 6B-6D are example screenshots of the lease calculation interface, according to one embodiment. For ease of discussion, the process 600 shown in FIG. 6A will be described in conjunction with the example screenshots shown in FIGS. 6B-6D.

Although not shown as part of the process, 600, the lease calculation module 225 may determine a gross capitalized cost for the vehicle based on information collected by the information collection module 210. In one embodiment, the information collection module 215 provides the vehicle's MSRP, the dealer's discount (e.g., the difference between the vehicle's MSRP and the dealer's asking price), and fees to be paid upon the transfer of the vehicle to the lease calculation module 225, and the lease calculation module 225 determines the gross capitalized cost for the vehicle by calculating a sum of these values. As noted above, the information collection module 215 can collect these values from a variety of different sources and with a variety of different techniques, such as API calls, a web scraping process, and user input.

The lease calculation module 225 provides 605 a lease calculation interface to be displayed to the customer on the customer device 130. Similar to the loan selection interface, the lease calculation interface includes one or more interface elements that allow the customer to select one or more lease parameters. Screenshots of an example lease selection interface are shown in FIGS. 6B and 6C. This example lease selection interface includes three sliders that allow the customer to select values for three lease parameters: the amount of a cash down payment, a lease term (in months), and the number of miles that the vehicle may be driven during each year of the lease term. In the first screenshot shown in FIG. 6B, the customer has used the sliders to select a cash down payment of $2000, a lease term of 36 months, and an annual mileage allowance of 12,000 miles.

The lease calculation module 225 receives 610 a set of lease parameters from the customer device 130 based on the customer's selections in the interface elements in lease calculation interface. For example, after the customer adjusts the sliders as shown in FIG. 6B, the lease calculation module 225 receives 610 a set of lease parameters specifying a down payment of $2000, a lease term of 36 months, and an annual mileage allowance of 12,000 miles.

The lease calculation module 225 performs calculations to divide 615 the available upfront capital for the vehicle transfer transaction into two portions. As referred to herein, the available upfront capital refers to the sum of the credits that can be applied toward the transaction at the time the transaction is formally agreed to (e.g., at the time the customer signs the lease). The available upfront capital may include, for example, a cash down payment, the value of a trade-in vehicle, or one or more rebates available for the vehicle.

The first portion of the available upfront capital is allocated to capitalized cost reduction. In other words, the first portion is used to reduce the net capitalized cost of the vehicle (i.e., the gross capitalized cost minus the capitalized cost reduction), which in turn reduces the monthly lease payments.

The second portion of the available upfront capital is allocated to upfront expenses. As referred to herein, upfront expenses are expenses to be paid at the beginning of the lease term, or at the time the vehicle transfer transaction is formally agreed to (e.g., at lease signing). These expenses may include, for example, tax paid on the capitalized cost reduction (e.g., the first portion), fees associated with title and registration, and the first monthly payment for the lease.

The lease calculation module 225 divides 615 the available upfront capital into the first portion and the second portion in a manner that causes the second portion to be the same as the total of the upfront expenses. In conventional leases, the entirety of the available upfront capital is allocated to capitalized cost reduction, which means that the customer had to pay for upfront expenses in addition to any cash down payment or vehicle trade-in that the customer was already planning to make. By dividing 615 the available upfront capital between the capitalized cost reduction and the upfront expenses in this manner, the customer is not required to make any upfront payments apart from the down payment. If the customer is not making a down payment and is not trading in a vehicle, the upfront capital is divided 615 so that a portion of the rebates are allocated to the upfront expenses, which means the customer is not required to pay for any upfront expenses out of pocket. In either case, dividing 225 the available upfront capital in this manner advantageously allows for a more streamlined and transparent transaction process with fewer unexpected expenses.

In one embodiment, the lease calculation module 225 divides 615 the available upfront capital using a different set of formulae depending on whether the vehicle transfer transaction takes place in a jurisdiction that imposes monthly sales taxes on lease payments or a jurisdiction that imposes a lump sum sales taxes on the total value of the lease payments. The jurisdiction of the transaction may be determined, for example, based on the customer's biographical information (e.g., the ZIP code in which the customer resides). As noted above, the available upfront capital includes cash (both a cash down payment and/or a cash value for a trade-in vehicle) and rebates. Each set of formulae below includes separate formulae for dividing the cash into two portions and for dividing the rebates into two portions. In particular, $x_c$ represents the portion of the cash to allocate to capital cost reduction, $y_c$ represents the portion of the cash to allocate to upfront expenses, $x_r$ represents the portion of the rebates to allocate to capitalized cost reduction, and $y_r$ represents the portion of the rebates to allocate to upfront expenses.

In a jurisdiction that imposes monthly sales taxes on lease payments, the lease calculation module 225 divides 615 the available upfront capital using the following set of formulae:

$$x_r = T_{rebates}$$

$$y_r = 0$$

$$x_c = \frac{1}{1 + R_{tax} * L_{cash} - \text{factor}} * \Big\{ [T_{cash} + T_{rebates} * (\text{factor} - R_{tax} * L_{rebates}) +$$
$$ti * (\text{factor} - R_{tax} * L_{tradein}) - F_{upfront}] +$$
$$\frac{(r_m * V_{residual} - r_m * r_c * G_{pretax})}{(r_c - 1)(1 + r_m)} * (1 + R_{tax}) - F_{local} * (1 + R_{tax}) \Big\}$$

$$y_c = T_{cash} - x_c$$

However, if any of these formulae returns a negative value, then the lease calculation module invalidates the results and instead divides 615 the available upfront capital using a secondary set of formulae:

$$x_r = \frac{1}{1 + R_{tax} * L_{rebates} - \text{factor}} *$$
$$\left\{[T_{cash} + T_{rebates} + ti * (\text{factor} - R_{tax} * L_{tradein}) - F_{upfront}] + \right.$$
$$\left. \frac{(r_m * V_{residual} - r_m * r_c * G_{pretax})}{(r_c - 1)(1 + r_m)} * (1 + R_{tax}) - F_{local} * (1 + R_{tax})\right\}$$

$$y_r = T_{rebates} - x_r$$

$$x_c = 0$$

$$y_c = T_{cash}$$

Finally, if one of the secondary formulae returns a negative value, then the lease calculation module 225 instead returns the following default solution, which allocates the entirety of the available upfront capital to the upfront expenses:

$x_r=0$
$y_r=T_{rebates}$
$x_c=0$
$y_c=T_{cash}$

In these formulae, $T_{cash}$ represents the customer's cash down payment, $T_{rebates}$ represents the total value of the rebates available for the transaction, $T_{products}$ represents the total value of the product add-ons that the customer has selected for the lease, t represents the term of the lease in months, $R_a$ represents the APR of the lease (which is received from a lender system 140 and has a value that depends on the customer's creditworthiness), $$r_m = \frac{R_a}{t}, r_c = (1 + r_m)^t,$$

$F_{upfront}$ represents the sum of the fees that the vehicle dealer charges the customer at lease signing, $F_{cap}$ represents the sum of the fees that are rolled into the lease and are not charged at lease signing, $F_{local}$ represents local fees in the customer's state, $V_{price}$ represents the MSRP of the vehicle, $V_{discounts}$ represents the value of any discounts applied by the vehicle dealer for the vehicle (e.g., the difference between the MSRP and the dealer's selling price), $V_{residual}$ represents the residual value of the vehicle (which is received from a lender system 140 and has a value that depends on the make and model of the vehicle, the lease term, and the annual mileage allowance), $TI_v$ represents the value of the customer's trade-in vehicle, $TI_p$ represents the remaining loan balance on the customer's trade-in vehicle, $ti=\max(0, TI_v-TI_p)$, $tin=\max(0, TI_p-TI_v)$, $R_{tax}$ represents the sales tax rate in the customer's jurisdiction, $G_{pretax}=V_{price}-V_{discounts}+F_{cap}+tin=T_{products}$, $L_{cash}$ is a binary value indicating whether the customer's jurisdiction collects taxes on a cash down payment for a lease, $L_{rebates}$ is a binary value indicating whether the customer's jurisdiction collects taxes on rebates applied toward a lease, and $L_{tradein}$ is a binary value indicating whether the customer's jurisdiction collects taxes on a trade-in vehicle whose value is applied toward a lease.

The term "factor" in these formulae represents the following constant:

$$\text{factor} = \frac{r_m * r_c}{(r_c - 1) * (1 + r_m)} * (1 + R_{tax})$$

In a jurisdiction that imposes a lump sum sales tax on the total value of lease payments, the lease calculation module 225 divides 615 the available upfront capital using the following set of formulae:

$$x_r = T_{rebates}$$

$$y_r = 0$$

$$x_c = \frac{1}{1 + R_{tax} * L_{cash} - \text{factor}} *$$
$$\{[T_{cash} + T_{rebates} * (\text{factor} - R_{tax} * L_{rebates}) + ti * (\text{factor} - R_{tax} * L_{tradein}) -$$
$$F_{upfront}] + (V_{residual} - r_c * G_{pretax} + r_c * \text{multiple} * t *$$
$$R_{tax} * (V_{residual} - r_c * G_{pretax})) * \text{multiple} - F_{local}\}$$

$$y_c = T_{cash} - x_c$$

Similarly, if any of these formulae returns a negative value, then the lease calculation module 225 invalidates the results and instead divides 615 the available upfront capital using a secondary set of formulae:

$$x_r = \frac{1}{1 + R_{tax} * L_{rebates} - \text{factor}} *$$
$$\{[T_{cash} + T_{rebates} + ti * (\text{factor} - R_{tax} * L_{tradein}) - F_{upfront}] +$$
$$(V_{residual} - r_c * G_{pretax} + r_c * \text{multiple} * t * R_{tax} *$$
$$(V_{residual} - r_c * G_{pretax})) * \text{multiple} - F_{local}\}$$

$$y_r = T_{rebates} - x_r$$

$$x_c = 0$$

$$y_c = T_{cash}$$

Lastly, if one of the secondary formulae returns a negative value, then the lease calculation module 225 instead returns the following default solution, which allocates the entirety of the available upfront capital to the upfront expenses:

$x_r=0$
$y_r=T_{rebates}$
$x_c=0$
$y_c=T_{cash}$

In these formulae, each variable represents the same value as noted above. The terms "multiple" and "factor" represent the following constants:

$$\text{multiple} = \frac{r_m}{(r_c - 1)(1 + r_m)}$$

$$\text{factor} = \text{multiple} * r_c * (1 + r_c * \text{multiple} * t * R_{tax})$$

The lease calculation module 225 calculates 620 a monthly lease payment. In one embodiment, the lease calculation module 225 first calculates the depreciation in the vehicle's value over the lease term. For example, the depreciation is the difference between the vehicle's net capitalized cost and the residual value of the vehicle. The lease calculation module 225 also calculates a rent charge based on the APR of the lease. After calculating the depreciation and the rent charge, the lease calculation module 225 computes a total lease payment by computing a sum containing the two values, and then the module 225 divides the total lease payment by the number of months in the lease term to calculate 620 the monthly lease payment.

The lease calculation module 225 provides 625 the monthly lease payment to the customer device 130 for display to the customer as part of the lease calculation interface. For example, in the screenshot shown in FIG. 6B, the monthly lease payment is $224. After the monthly lease payment is displayed to the customer, the customer may adjust the interface elements to select different lease parameters. If the customer adjusts one of the interface elements, the lease calculation module 220 receives 610 a second set of lease parameters (e.g., containing at least one parameter with a different value than in the previous set of lease parameters), performs the dividing 615 and calculating 620 steps again, and provides 625 an updated monthly lease payment for display to the customer. For example, in the second screenshot shown in FIG. 6C, the customer has adjusted the mileage allowance slider from 12,000 miles to 15,000 miles, which yields an updated monthly lease payment of $242.

The customer may alternatively select the lease, in which case the lease calculation module 225 receives 630 a selection of the lease. In one embodiment, the monthly lease payment displayed with a "details" option, as shown in the examples illustrated in FIGS. 6B and 6C, and the customer selects the lease by selecting the "details" option to display a lease detail screen (e.g., as shown in FIG. 6D), and then selecting a "select this lease" option on the lease detail screen.

In an alternative embodiment, the lease calculation module 220 performs the dividing 615 and calculating 620 steps ahead of time (e.g., after receiving the necessary information and before receiving 610 any desired lease parameters) for each possible combination of lease parameters (or a subset of the possible combinations of lease parameters) and stores the results in a lease calculation array that is indexed according to the lease parameters. In this embodiment, rather than performing the dividing 615 and calculating 620 steps again responsive to receiving a second set of lease parameters, the lease calculation module 220 accesses the result for the second set of parameters in the lease calculation array and provides 625 the results (including the monthly lease payment) for display to the customer. Performing the dividing 615 and calculating 620 steps ahead of time in this manner may advantageously make the lease calculation interface faster and more responsive because the least calculation module 220 is accessing an array (rather than performing the more computationally intensive dividing 615 and calculating 620 steps) when the customer adjusts one of the interface elements.

Example Machine Architecture

Figure 7:
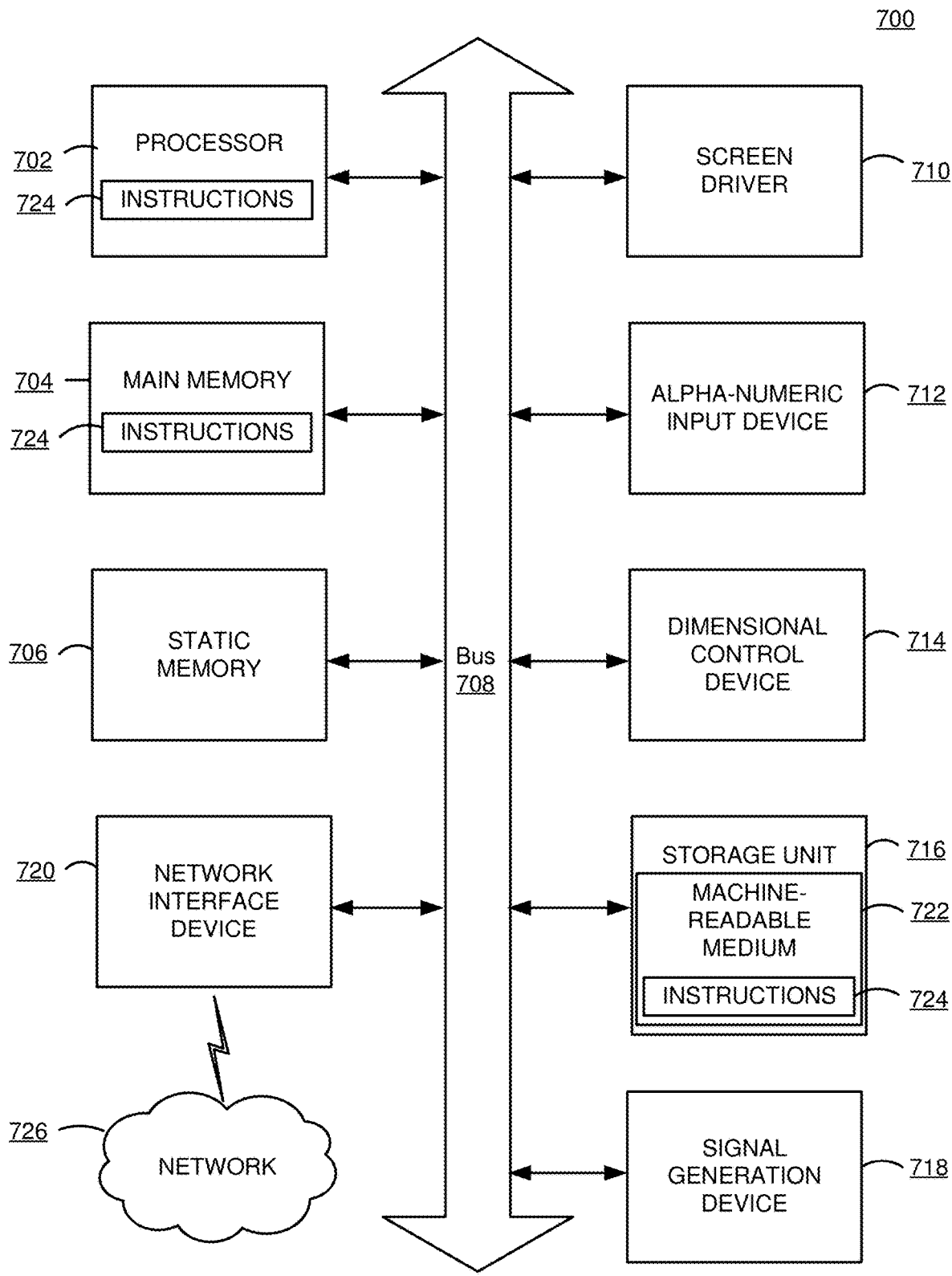
FIG. 7 is a block diagram illustrating components of an example machine able to read instructions from a machine-readable medium and execute them in one or more processors (or controllers), according to one embodiment.

FIG. 7 is a block diagram illustrating components of an example machine able to read instructions from a machine-readable medium and execute them in one or more processors (or controllers), according to one embodiment.

In FIG. 7 there is a diagrammatic representation of a machine in the example form of a computer system 700. The computer system 700 can be used to execute instructions 724 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine in this example can be any of the devices or systems 110 through 150 shown in the system environment, such as the vehicle transfer system 110, the vehicle dealer system 120, the customer device 130, the lender system 140, or the third-party system 150. However, the architecture described may be applicable to other computer systems that operate in the system environment 100. These other example computer systems include a server computer, a client computer, a personal computer (PC), a tablet PC, a smartphone, an internet of things (IoT) appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 700 also includes a main memory 704. The computer system may include a storage unit 716. The processor 702, memory 704 and the storage unit 716 communicate via a bus 708.

In addition, the computer system 700 can include a static memory 706, a screen driver 710 (e.g., to drive a screen, such as a plasma display panel (PDP), a liquid crystal display (LCD), or a projector). The computer system 700 may also include input/output devices, e.g., an alphanumeric input device 712 (e.g., a keyboard), a dimensional (e.g., 2-D or 3-D) control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722. The machine readable medium 722 may be flash, a magnetic disk, and/or optical storage. The machine readable medium 722 stores instructions 724 (e.g., software) embodying any one or more of the methodologies or functions described herein. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The disclosed configurations offer several benefits and advantages over conventional methods of performing a vehicle transfer transaction. In particular, a process for applying for a loan via a conventional online system requires the customer to provide his or her biographical information and select a single set of loan parameters when submitting an online loan application, and the customer receives a single loan offer in response to the loan application. Furthermore, it takes between several minutes and several days for a lender to provide the loan offer in response to the loan application. If the customer is dissatisfied with the loan offer, the customer typically has to submit another online loan application, either to the same lender or to a different lender, and wait to receive another loan offer. As a result, a customer may need to submit several online loan applications in order to receive a satisfactory loan offer, which can be a long, drawn-out, and inconvenient process for the customer.

In contrast, the loan selection process disclosed herein provides a structured user interface that prompts the customer to provide his or her biographical information a single time, uses the information to request a plurality of loan offers from several different lenders, and then provides the customer with a loan selection interface that allows the customer to browse through the loan offers. This provides a much faster and more streamlined process that allows the customer to select a loan offer that is satisfactory to the customer without having to submit and wait for multiple online loan applications. Thus, it takes significantly less time for the customer to select a satisfactory loan offer, which reduces the overall length of time taken to complete the transaction.

Similarly, lease information provided by conventional online calculation tools simply provide estimates of the upfront payment and monthly payments for a lease. Conventional tools are only able to provide estimates, rather than perform a more accurate calculation, because they do not have access to sufficient information (e.g., applicable rebates, the customer's creditworthiness, information about taxes and fees, etc.). As a result, the estimates produced by conventional lease calculation tools may differ from the actual upfront and monthly payments that a customer commits to, which may cause the customer to place less trust in the estimate and hesitate before proceeding with the transaction.

In contrast, the leasing calculation process described herein is part of a broader process for performing an entire vehicle transfer transaction, which means the vehicle transfer system 110 has access to enough information to perform a more accurate calculation (and, in some embodiments, an exact calculation down to the penny) to determine the amount of each monthly payment. In addition, the leasing calculation process described herein is a specific process for calculating a lease that divides the available upfront capital between capitalized cost reduction and upfront expenses, whereas a conventional leasing calculation simply allocates the entirety of the available upfront capital to the capitalized cost reduction. As noted above, dividing the available upfront capital in this manner is advantageous because it allocates a portion of the available upfront capital to the upfront expenses, which means the customer does not have to make any additional out-of-pocket payments at lease signing. Finally, the result of the leasing calculation is provided for display to the customer in a lease calculation interface that allows the customer to view immediate and accurate data about the lease before committing to it, which means the customer may place more trust in the calculation and lead to a faster completion of the vehicle transfer transaction on the vehicle dealer's website.

More broadly, the vehicle transaction process described herein provides several features that allow for a vehicle transfer transaction to be completed more quickly and efficiently. First, the vehicle transfer system 110 collects information from multiple sources and via multiple methods, such as API calls, web scraping processes, direct file transfers, and user inputs, and is capable automatically combining the information to rapidly provide accurate data for the various financing options that the customer may choose from. Second, both the loan selection interface and the lease calculation interface are capable of rapidly displaying updated financing data (e.g., by accessing data in an array or recalculating certain values) in response to the customer making a change to one or more financing parameters. Third, even though the dealer system (which provides the dealer website) is separate from the vehicle transfer system (which provides the vehicle transfer interface and facilitates the transaction), the vehicle transfer interface is displayed as part of the dealer website so the customer can perform the entire vehicle transfer transaction without leaving the dealer's website. Because vehicle transfer transactions can be subject to a quick time window in which to enter into, negotiate, and close the transaction, these features (and other features) of the disclosed embodiments advantageously allow a dealer to carry out an online vehicle transfer transaction more rapidly, which advantageously increases the likelihood of retaining customers who begin the vehicle transfer transaction on the vehicle transfer interface provided on the dealer's website.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIG. 2. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 702, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for automatically detecting and executing a return path for a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:

determining, by a server that provides a vehicle transaction user interface, that the vehicle transaction user interface is output by the customer device, the vehicle transaction user interface including fields intended for use by customers and excluding a dealer field intended for use by a vehicle dealer;

responsive to determining that the vehicle transaction user interface is output by the customer device, and while the vehicle transaction user interface is output by the customer device, determining, by the server, whether to adjust an operating mode of the vehicle transaction user interface based on whether a location of the customer device is presently located within an area associated with the vehicle dealer, the location of the customer device being determined based on whether an IP address of the customer device used to access the vehicle transaction user interface belongs to the vehicle dealer;

responsive to determining that the location of the customer device is presently located within the area associated with the vehicle dealer, automatically selecting, by the server, an assisted operating mode that is disabled unless the customer device is determined to be presently located within the area associated with the vehicle dealer based on the IP address of the customer device while the vehicle transaction user interface is output by the customer device;

responsive to the selecting of the assisted operating mode;
  modifying, by the server, the vehicle transaction user interface of the customer device to include the dealer field, thereby allowing the vehicle dealer to select one or more parameters, the dealer field not being included in the vehicle transaction user interface of the customer device unless the assisted operating mode is selected, and
  disabling transmission of information to the customer device that would be transmitted under an operating mode other than the assisted operating mode;

receiving, by the server, in the at least one field, the one or more parameters, the one or more parameters having been input by the vehicle dealer using the dealer field;

scraping, from a website of the vehicle dealer, information about a vehicle to be transferred from a vehicle dealer to a customer;

generating a request comprising the one or more parameters input by the vehicle dealer using the dealer field as well as input by the customer into the vehicle transaction user interface using fields other than the dealer field;

receiving, by the server, a response to the request comprising a plurality of selectable options and receiving, by the server, from the customer device, a selection of a selectable option of the plurality of selectable options.

2. The method of claim 1, wherein the request comprises a selling price of the vehicle, the selling price obtained by performing a web scraping process on a website operated by the vehicle dealer.

3. The method of claim 1, wherein the request comprises one or more rebates applicable to the vehicle, the rebates obtained by sending a request to an application programming interface, the request comprising a vehicle identification number of the vehicle.

4. The method of claim 1, wherein the request comprises a measure of creditworthiness for the customer received from a credit reporting agency.

5. The method of claim 1, wherein the request comprises a measure of creditworthiness for the customer received as user input from the customer.

6. The method of claim 1, further comprising:
generating an aggregated loan offer array comprising loan offers from each of a plurality of loan offer arrays; and
responsive to receiving a set of desired loan parameters, identifying, in the aggregated loan offer array, a set of loan offers matching the set of desired loan parameters.

7. The method of claim 6, further comprising:
after providing the set of loan offers for display to the customer, receiving, from the customer device, a second set of desired loan parameters, at least one loan parameter in the second set of desired loan parameters having a different value than a corresponding loan parameter in the initial set of desired loan parameters; and
responsive to receiving the second set of desired loan parameters, providing, for display to the customer on the customer device in the loan selection interface, a second set of loan offers matching the second set of desired loan parameters.

8. The method of claim 1, wherein the selection of the selectable options comprises a selection of a loan offer, the method further comprising:
after receiving the customer selection of the loan offer, receiving, from the customer device, a formal agreement by the customer to a vehicle transfer transaction that transfers possession of the vehicle to the customer subject to the customer providing payment according to the terms of the loan.

9. A non-transitory computer-readable storage medium having instructions stored thereon, the instructions when executed by a processor causing the processor to perform operations comprising:
determining, by a server that provides a vehicle transaction user interface, that the vehicle transaction user interface is output by the customer device, the vehicle transaction user interface including fields intended for use by customers and excluding a dealer field intended for use by a vehicle dealer;

responsive to determining that the vehicle transaction user interface is output by the customer device, and while the vehicle transaction user interface is output by the customer device, determining, by the server, whether to adjust an operating mode of the vehicle transaction user interface based on whether a location of the customer device is presently located within an area associated with the vehicle dealer, the location of the customer device being determined based on whether an IP address of the customer device used to access the vehicle transaction user interface belongs to the vehicle dealer;

responsive to determining that the location of the customer device is presently located within the area associated with the vehicle dealer, automatically selecting, by the server, an assisted operating mode that is disabled unless the customer device is determined to be presently located within the area associated with the vehicle dealer based on the IP address of the customer device while the vehicle transaction user interface is output by the customer device;

responsive to the selecting of the assisted operating mode:
  modifying, by the server, the vehicle transaction user interface of the customer device to include the dealer field, thereby allowing the vehicle dealer to select one or more parameters, the dealer field not being included in the vehicle transaction user interface of the customer device unless the assisted operating mode is selected, and
  disabling transmission of information to the customer device that would be transmitted under an operating mode other than the assisted operating mode;

receiving, by the server, in the at least one field, the one or more parameters, the one or more parameters having been input by the vehicle dealer using the dealer field;

scraping, from a website of the vehicle dealer, information about a vehicle to be transferred from a vehicle dealer to a customer;

generating a request comprising the one or more parameters input by the vehicle dealer using the dealer field as well as input by the customer into the vehicle transaction user interface using fields other than the dealer field;

receiving, by the server, a response to the request comprising a plurality of selectable options; and receiving, by the server, from the customer device, a selection of a selectable option of the plurality of selectable options.

10. The non-transitory computer-readable storage medium of claim 9, wherein the request comprises a selling price of the vehicle, the selling price obtained by performing a web scraping process on a website operated by the vehicle dealer.

11. The non-transitory computer-readable storage medium of claim 9, wherein the request comprises one or more rebates applicable to the vehicle, the rebates obtained by sending a request to an application programming interface, the request comprising a vehicle identification number of the vehicle.

12. The non-transitory computer-readable storage medium of claim 9, wherein the request comprises a measure of creditworthiness for the customer received from a credit reporting agency.

13. The non-transitory computer-readable storage medium of claim 9, wherein the request comprises a measure of creditworthiness for the customer received as user input from the customer.

14. The non-transitory computer-readable storage medium of claim 9, the operations further comprising:
generating an aggregated loan offer array comprising loan offers from each of a plurality of loan offer arrays; and
responsive to receiving a set of desired loan parameters, identifying, in the aggregated loan offer array, a set of loan offers matching the set of desired loan parameters.

15. The non-transitory computer-readable storage medium of claim 14, the operations further comprising:
after providing the set of loan offers for display to the customer, receiving, from the customer device, a second set of desired loan parameters, at least one loan parameter in the second set of desired loan parameters having a different value than a corresponding loan parameter in the initial set of desired loan parameters; and
responsive to receiving the second set of desired loan parameters, providing, for display to the customer on the customer device in the loan selection interface, a second set of loan offers matching the second set of desired loan parameters.

16. The non-transitory computer-readable storage medium of claim 9, wherein the selection of the selectable options comprises a selection of a loan offer, the operations further comprising:
after receiving the customer selection of the loan offer, receiving, from the customer device, a formal agreement by the customer to a vehicle transfer transaction that transfers possession of the vehicle to the customer subject to the customer providing payment according to the terms of the loan.

17. A computing system comprising:
a processor; and
a non-transitory computer-readable storage medium having instructions stored thereon, the instructions when executed by the processor causing the processor to perform operations comprising:
determining, by a server that provides a vehicle transaction user interface, that the vehicle transaction user interface is output by the customer device, the vehicle transaction user interface including fields intended for use by customers and excluding a dealer field intended for use by a vehicle dealer;
responsive to determining that the vehicle transaction user interface is output by the customer device, and while the vehicle transaction user interface is output by the customer device, determining, by the server, whether to adjust an operating mode of the vehicle transaction user interface based on whether a location of the customer device is presently located within an area associated with the vehicle dealer, the location of the customer device being determined based on whether an IP address of the customer device used to access the vehicle transaction user interface belongs to the vehicle dealer;
responsive to determining that the location of the customer device is presently located within the area associated with the vehicle dealer, automatically selecting, by the server, an assisted operating mode that is disabled unless the customer device is determined to be presently located within the area associated with the vehicle dealer based on the IP address of the customer device while the vehicle transaction user interface is output by the customer device;
responsive to the selecting of the assisted operating mode:
modifying, by the server, the vehicle transaction user interface of the customer device to include the dealer field, thereby allowing the vehicle dealer to select one or more parameters, the dealer field not being included in the vehicle transaction user interface of the customer device unless the assisted operating mode is selected, and
disabling transmission of information to the customer device that would be transmitted under an operating mode other than the assisted operating mode;
receiving, by the server, in the at least one field, the one or more parameters, the one or more parameters having been input by the vehicle dealer using the dealer field;
scraping, from a website of the vehicle dealer, information about a vehicle to be transferred from a vehicle dealer to a customer;
generating a request comprising the one or more parameters input by the vehicle dealer using the dealer field as well as input by the customer into the vehicle transaction user interface using fields other than the dealer field;
receiving, by the server, response to the request comprising a plurality of selectable options; and
receiving, by the server, from the customer device, a selection of a selectable option of the plurality of selectable options.

18. The computing system of claim 17, wherein the request comprises a selling price of the vehicle, the selling price obtained by performing a web scraping process on a website operated by the vehicle dealer.

19. The computing system of claim 17, wherein the request comprises one or more rebates applicable to the vehicle, the rebates obtained by sending a request to an application programming interface, the request comprising a vehicle identification number of the vehicle.

20. The computing system of claim 17, wherein the request comprises a measure of creditworthiness for the customer received from a credit reporting agency.

* * * * *